(12) United States Patent
Mikhaylik et al.

(10) Patent No.: US 12,438,196 B2
(45) Date of Patent: Oct. 7, 2025

(54) ELECTROLYTES FOR LITHIUM BATTERIES

(71) Applicant: Sion Power Corporation, Tucson, AZ (US)

(72) Inventors: Yuriy V. Mikhaylik, Tucson, AZ (US); Igor P. Kovalev, Vail, AZ (US); Alexis Sheffield, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 662 days.

(21) Appl. No.: 17/712,754

(22) Filed: Apr. 4, 2022

(65) Prior Publication Data

US 2022/0328880 A1    Oct. 13, 2022

Related U.S. Application Data

(60) Provisional application No. 63/172,529, filed on Apr. 8, 2021.

(51) Int. Cl.
*H01M 10/0569* (2010.01)
*H01M 4/134* (2010.01)
*H01M 10/0525* (2010.01)

(52) U.S. Cl.
CPC ....... *H01M 10/0569* (2013.01); *H01M 4/134* (2013.01); *H01M 10/0525* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 5,194,341 | A | 3/1993 | Bagley et al. |
| 5,538,812 | A | 7/1996 | Lee et al. |
| 5,648,187 | A | 7/1997 | Skotheim |
| 5,919,587 | A | 7/1999 | Mukherjee et al. |
| 5,961,672 | A | 10/1999 | Skotheim et al. |
| 6,153,337 | A | 11/2000 | Carlson et al. |
| 6,238,821 | B1 | 5/2001 | Mukherjee et al. |
| 6,306,545 | B1 | 10/2001 | Carlson et al. |
| 6,733,924 | B1 | 5/2004 | Skotheim et al. |

(Continued)

FOREIGN PATENT DOCUMENTS

| | | |
|---|---|---|
| CN | 102055018 A | 5/2011 |
| EP | 1 088 814 A1 | 4/2001 |

(Continued)

OTHER PUBLICATIONS

Derwent Abstract of KR-2021-0008728 A (Year: 2021).*

(Continued)

*Primary Examiner* — Kevin M Bernatz
(74) *Attorney, Agent, or Firm* — Wolf, Greenfield & Sacks, P.C.

(57) ABSTRACT

Aspects of the present disclosure are directed towards increases in cycle life and stability of electrochemical cells. Electrolytes and electrochemical cells, including those for use in rechargeable lithium batteries, are generally provided. In some embodiments, the electrolytes and electrochemical cells comprise asymmetric sulfonamides. The electrolytes and electrochemical cells also comprise carbonates, according to some embodiments.

20 Claims, 1 Drawing Sheet

(56) References Cited

U.S. PATENT DOCUMENTS

| | | | |
|---|---|---|---|
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,737,039 B2 | 5/2014 | Michot et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 10,608,278 B2 | 3/2020 | Liao et al. |
| 10,629,947 B2 | 4/2020 | Affinito et al. |
| 10,629,954 B2 | 4/2020 | Mikhaylik et al. |
| 10,720,648 B2 | 7/2020 | Quero-Mieres et al. |
| 10,847,833 B2 | 11/2020 | Bunte et al. |
| 10,862,105 B2 | 12/2020 | Gronwald et al. |
| 10,868,306 B2 | 12/2020 | Mudalige et al. |
| 10,879,527 B2 | 12/2020 | Laramie et al. |
| 10,944,094 B2 | 3/2021 | Liao et al. |
| 10,965,130 B2 | 3/2021 | Mikhaylik et al. |
| 10,991,925 B2 | 4/2021 | Wang et al. |
| 11,024,923 B2 | 6/2021 | Liao et al. |
| 11,038,178 B2 | 6/2021 | Liao et al. |
| 11,041,248 B2 | 6/2021 | Laramie et al. |
| 11,056,728 B2 | 7/2021 | Mikhaylik et al. |
| 11,088,395 B2 | 8/2021 | Mikhaylik et al. |
| 11,108,076 B2 | 8/2021 | Scordilis-Kelley et al. |
| 11,108,077 B2 | 8/2021 | Scordilis-Kelley et al. |
| 11,121,397 B2 | 9/2021 | Scordilis-Kelley et al. |
| 11,165,122 B2 | 11/2021 | Laramie et al. |
| 11,183,690 B2 | 11/2021 | Wang et al. |
| 11,228,055 B2 | 1/2022 | Liao et al. |
| 11,233,243 B2 | 1/2022 | Affinito et al. |
| 11,239,504 B2 | 2/2022 | Laramie et al. |
| 11,245,103 B2 | 2/2022 | Mikhaylik et al. |
| 11,251,501 B2 | 2/2022 | Schneider et al. |
| 11,316,204 B2 | 4/2022 | Mikhaylik et al. |
| 11,322,804 B2 | 5/2022 | Laramie et al. |
| 2005/0196672 A1 | 9/2005 | Mukherjee et al. |
| 2006/0115579 A1 | 6/2006 | Mukherjee et al. |
| 2007/0221265 A1 | 9/2007 | Affinito et al. |
| 2007/0224514 A1 | 9/2007 | Kotato et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2010/0035128 A1 | 2/2010 | Scordilis-Kelley et al. |
| 2010/0239914 A1 | 9/2010 | Mikhaylik et al. |
| 2011/0006738 A1 | 1/2011 | Mikhaylik et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2013/0316072 A1 | 11/2013 | Scordilis-Kelley et al. |
| 2014/0272594 A1 | 9/2014 | Safont Sempere et al. |
| 2014/0272595 A1 | 9/2014 | Cristadoro et al. |
| 2014/0377666 A1* | 12/2014 | Kodama ........... H01M 10/0567 429/188 |
| 2015/0162586 A1 | 6/2015 | Fleischmann et al. |
| 2015/0188194 A1 | 7/2015 | Mikhaylik et al. |
| 2015/0236322 A1 | 8/2015 | Laramie et al. |
| 2015/0287986 A1 | 10/2015 | Affinito et al. |
| 2016/0118638 A1 | 4/2016 | Gronwald et al. |
| 2016/0118651 A1 | 4/2016 | Kovalev et al. |
| 2017/0141385 A1 | 5/2017 | Scordilis-Kelley et al. |
| 2017/0141402 A1 | 5/2017 | Affinito et al. |
| 2018/0006303 A1 | 1/2018 | Mikhaylik et al. |
| 2018/0254516 A1 | 9/2018 | Han et al. |
| 2018/0261820 A1 | 9/2018 | Liao et al. |
| 2018/0301697 A1 | 10/2018 | Affinito et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0312308 A1* | 10/2019 | Park .................. H01M 10/0567 |
| 2020/0044460 A1 | 2/2020 | Mikhaylik et al. |
| 2020/0083564 A1 | 3/2020 | Odani et al. |
| 2020/0194822 A1 | 6/2020 | Laramie et al. |
| 2020/0220149 A1 | 7/2020 | Laramie et al. |
| 2020/0220197 A1 | 7/2020 | Laramie et al. |
| 2020/0220205 A1 | 7/2020 | Affinito et al. |

(56) References Cited

U.S. PATENT DOCUMENTS

| | | |
|---|---|---|
| 2020/0220222 A1* | 7/2020 | Watarai .................. H01M 4/625 |
| 2020/0373551 A1 | 11/2020 | Milobar et al. |
| 2020/0373578 A1 | 11/2020 | Wang et al. |
| 2020/0381781 A1* | 12/2020 | Woo ........................ H01M 4/58 |
| 2020/0395585 A1 | 12/2020 | Laramie et al. |
| 2021/0057753 A1 | 2/2021 | Viner et al. |
| 2021/0135192 A1 | 5/2021 | Gronwald et al. |
| 2021/0135205 A1 | 5/2021 | Laramie et al. |
| 2021/0135297 A1 | 5/2021 | Mikhaylik et al. |
| 2021/0138673 A1 | 5/2021 | Shannon et al. |
| 2021/0151815 A1 | 5/2021 | Milobar et al. |
| 2021/0151816 A1 | 5/2021 | Shayan et al. |
| 2021/0151817 A1 | 5/2021 | Jennings et al. |
| 2021/0151830 A1 | 5/2021 | Shayan et al. |
| 2021/0151839 A1 | 5/2021 | Niedzwiecki et al. |
| 2021/0151840 A1 | 5/2021 | Shayan et al. |
| 2021/0151841 A1 | 5/2021 | Johnson et al. |
| 2021/0193984 A1 | 6/2021 | Laramie et al. |
| 2021/0193985 A1 | 6/2021 | Laramie et al. |
| 2021/0193996 A1 | 6/2021 | Laramie et al. |
| 2021/0194069 A1 | 6/2021 | Hamblin et al. |
| 2021/0218243 A1 | 7/2021 | Hamblin et al. |
| 2021/0249651 A1 | 8/2021 | Laramie et al. |
| 2021/0265610 A1 | 8/2021 | Liao et al. |
| 2021/0328274 A1 | 10/2021 | Mikhaylik et al. |
| 2021/0408550 A1 | 12/2021 | Liao et al. |
| 2021/0408598 A1 | 12/2021 | Mikhaylik et al. |
| 2022/0029191 A1 | 1/2022 | Scordilis-Kelley et al. |
| 2022/0048121 A1 | 2/2022 | Child et al. |
| 2022/0069593 A1 | 3/2022 | Hamblin et al. |
| 2022/0102759 A1* | 3/2022 | Wu .......................... H01M 4/48 |
| 2022/0109215 A1 | 4/2022 | Laramie et al. |
| 2022/0115649 A1 | 4/2022 | Kovalev et al. |
| 2022/0115704 A1 | 4/2022 | Mikhaylik et al. |
| 2022/0115705 A1 | 4/2022 | Kovalev et al. |
| 2022/0115715 A1 | 4/2022 | Kovalev et al. |
| 2022/0173434 A1* | 6/2022 | Matsubara ........ H01M 10/0567 |
| 2024/0055647 A1* | 2/2024 | Scordilis-Kelley ... H01M 4/505 |
| 2024/0120539 A1* | 4/2024 | Lee .................. H01M 10/0568 |
| 2024/0128514 A1* | 4/2024 | Shao-Horn ....... H01M 10/0567 |
| 2024/0194948 A1* | 6/2024 | Ito ..................... H01M 10/0568 |
| 2024/0283022 A1* | 8/2024 | Mikhaylik ........ H01M 10/0569 |
| 2024/0339661 A1* | 10/2024 | Ji ...................... H01M 10/0525 |

FOREIGN PATENT DOCUMENTS

| | | | | |
|---|---|---|---|---|
| EP | 3 050 872 A1 | | 8/2016 | |
| KR | 20210008728 A1 | * | 1/2021 | .......... H01M 10/052 |
| WO | WO 99/33125 A1 | | 7/1999 | |
| WO | WO 99/43034 A1 | | 8/1999 | |
| WO | WO-2021071109 A1 | * | 4/2021 | .......... H01M 10/052 |

OTHER PUBLICATIONS

Weigel et al. (ChemElectroChem., 2020,vol. 7, No. 9, pp. 2107-2113) (Year: 2020).*
ISR showing citation of Weigel et al. reference above (Year: 2022).*
Machine Translation of KR 2021-0008728 A. (Year: 2021).*
International Search Report and Written Opinion for International Application No. PCT/US2022/023283 dated Aug. 1, 2022.

* cited by examiner

ELECTROLYTES FOR LITHIUM BATTERIES

RELATED APPLICATIONS

This application claims priority to U.S. Provisional Application No. 63/172,529, filed Apr. 8, 2021, which is incorporated herein by reference in its entirety.

TECHNICAL FIELD

Electrolytes and electrochemical cells, including those for use in rechargeable lithium batteries, are generally described.

BACKGROUND

There has been considerable interest in recent years in developing high energy density rechargeable Li-ion batteries that use an intercalated lithium compound as the cathode active material. In such cells, current electrolytes are typically based on solutions of lithium salts and carbonate electrolytes. In particular, these electrolytes typically undergo rapid degradation during repeated charge-discharge processes. Thus, rechargeable batteries with such electrolytes generally exhibit limited cycle lifetimes. Accordingly, electrochemical cells and electrolytes for increasing the cycle lifetime and/or other improvements would be beneficial.

SUMMARY

Aspects of the present disclosure are directed towards increases in cycle life and stability of electrochemical cells. Electrolytes and electrochemical cells, including those for use in rechargeable lithium batteries, are generally provided. In some embodiments, the electrolytes and electrochemical cells comprise asymmetric sulfonamides. The electrolytes and electrochemical cells also comprise carbonates, according to some embodiments. The subject matter of the present invention involves, in some cases, interrelated products, alternative solutions to a particular problem, and/or a plurality of different uses of one or more systems and/or articles.

Some aspects are directed towards electrochemical cells. In some embodiments, an electrochemical cell, comprises: a first electrode comprising lithium; a first solvent comprising an asymmetric sulfonamide; and a second solvent, wherein the second solvent comprises both a cyclic carbonate and a linear carbonate, wherein the asymmetric sulfonamide has a formula (I):

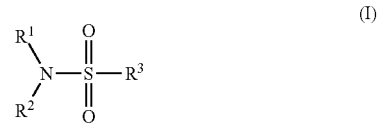

wherein $R^1$ and $R^2$ can be the same or different and each is independently selected from unsubstituted, branched or unbranched aliphatic chains; silyl substituents; or wherein $R^1$ and $R^2$ are connected to form an N-bound heterocycle; wherein, if $R^1$ is selected from unsubstituted, branched or unbranched aliphatic chains, $R^1$ comprises n carbon atoms, where n is an integer greater than or equal to 1 and less than or equal to 10; wherein, if $R^2$ is selected from unsubstituted, branched or unbranched aliphatic chains, $R^2$ comprises m carbon atoms, where m is an integer greater than or equal to 1 and less than or equal to 10; wherein, if $R^1$ and $R^2$ are connected to form an N-bound heterocycle, the N-bound heterocycle comprises j carbon atoms, where j is an integer greater than or equal to 2 and less than or equal to 11; wherein, if $R^1$ and/or $R^2$ is a silyl substituent, the silyl substituent has the form $SiR^4_3$, where $R^4$ is an unsubstituted, branched or unbranched aliphatic chain comprising k carbon atoms, where k is an integer greater than or equal to 1 and less than or equal to 10; and wherein $R^3$ is an electron withdrawing species.

Another aspect is directed towards electrochemical cells. In some embodiments, an electrochemical cell, comprises: an electrode comprising lithium; and an asymmetric sulfonamide; wherein the asymmetric sulfonamide has a formula (I);

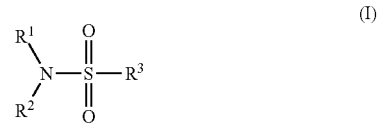

wherein $R^1$ and $R^2$ can be the same or different and each is selected from unsubstituted, branched or unbranched aliphatic chains; silyl substituents; or wherein $R^1$ and $R^2$ are connected to form an N-bound heterocycle; wherein, if $R^1$ is selected from unsubstituted, branched or unbranched aliphatic chains, $R^1$ comprises n carbon atoms, where n is an integer greater than or equal to 1 and less than or equal to 10, and $R^2$ is a silyl substituent; wherein, if $R^2$ is selected from unsubstituted, branched or unbranched aliphatic chains, $R^2$ comprises m carbon atoms, where m is an integer greater than or equal to 1 and less than or equal to 10, and $R^1$ is a silyl substituent; wherein, if $R^1$ and $R^2$ are connected to form an N-bound heterocycle, the N-bound heterocycle, comprises j carbon atoms, where j is an integer greater than or equal to 2 and less than or equal to 11; wherein, if $R^1$ and/or $R^2$ is a silyl substituent, the silyl substituent has the form $SiR^4_3$, where $R^4$ is an unsubstituted, branched or unbranched aliphatic chain comprising k carbon atoms, where k is an integer greater than or equal to 1 and less than or equal to 10; and wherein $R^3$ is an electron withdrawing species.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

One of the fundamental problems in battery technology is the limited cycle life of rechargeable electrochemical cells. Currently, electrolytes used in lithium intercalation cathode batteries yield cells with a limited cycle life. Furthermore, the high reactivity of lithium metal means that lithium-based battery technology often faces issues with thermal runaway and gas generation, which can limit the utility of these electrochemical cells. The present disclosure is directed towards innovative electrochemical cells and electrolytes that can, according to some embodiments, increase the cycle life and stability of batteries. In some embodiments, electrolytes comprising asymmetric sulfonamides as described below can advantageously improve the cycle life and stability of electrochemical cells and/or reduce undesirable gas generation. In some aspects, new asymmetric sulfonamides are described. According to some embodiments, the asymmetric sulfonamides perform unexpectedly well when combined with carbonates in an electrolyte of the electrochemical cell.

The embodiments described herein may be used in association with any suitable type of electrochemical cell of a battery, such as an electrochemical cell of a lithium-ion or lithium-based battery (e.g., a battery including a lithium-ion electrode and a lithium metal counter electrode). In some embodiments, the electrochemical cell is a primary (non-rechargeable) battery. In other embodiments, the electrochemical cell is a secondary (rechargeable) battery. Some embodiments relate to lithium rechargeable batteries. Additionally, although embodiments of the invention are particularly useful for improving the cycle life and stability of electrochemical cells, the embodiments described herein may be applicable to other applications in which electrolytic solvents are desired.

Figure 1A:
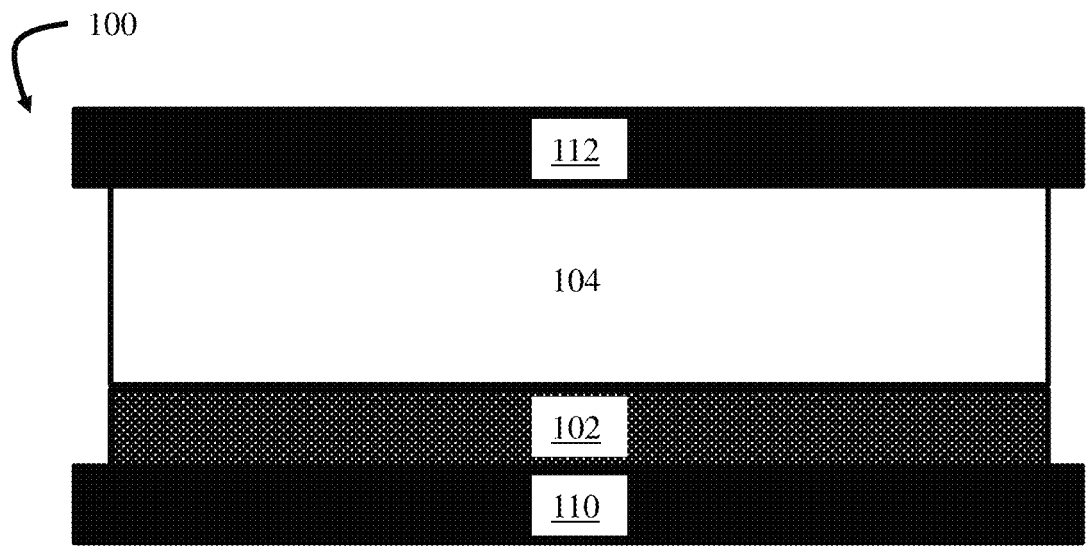
FIGS. 1A-1B present cross-sectional schematic illustrations of exemplary electrochemical cells, according to some embodiments.
Figure 1B:
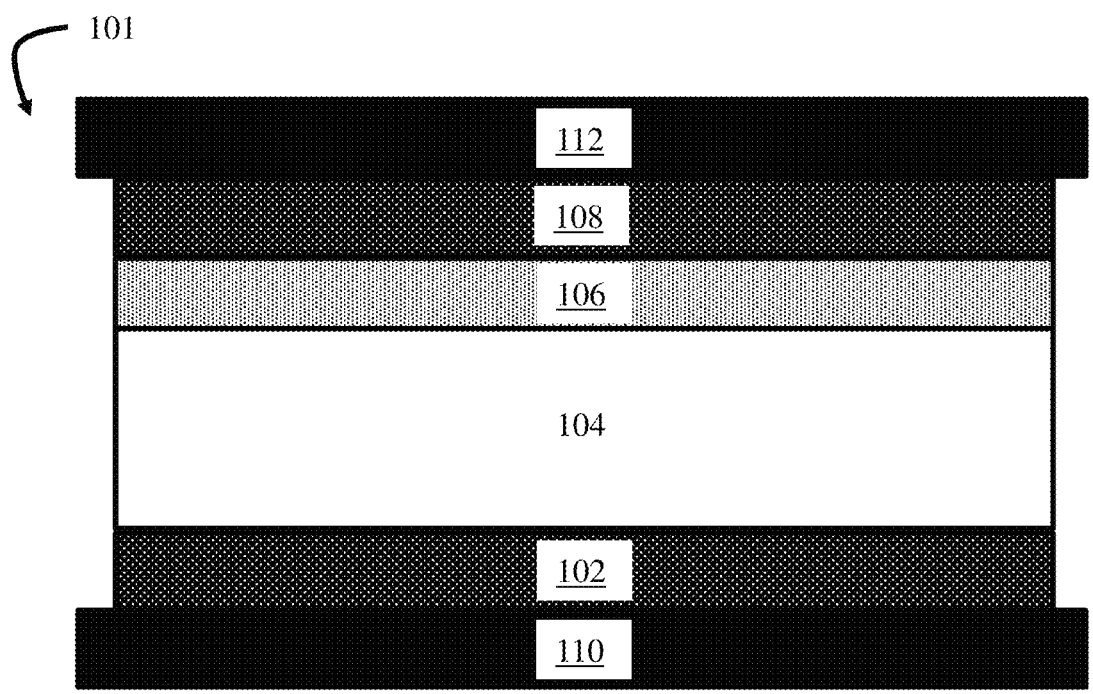

Electrochemical cells described herein can include an electrode (e.g., a first electrode). In some embodiments, the electrode (e.g., a first electrode) is a cathode, as described in more detail below. In some embodiments, the electrode is an anode, as described in more detail below. The electrode may, according to some embodiments, comprise lithium (e.g., if the electrode is part of a lithium-ion battery). FIGS. 1A-1B present cross-sectional schematic illustrations of electrochemical cells, according to some embodiments. In FIGS. 1A-1B, electrochemical cells 100 and 101 comprise an electrode 102 that may comprise lithium, as well as an optional first current collector 110 and an optional second current collector 112. Electrochemical cells further comprise an electrolyte, according to some embodiments. For example, in FIGS. 1A-1B, an electrolyte 104 is present. In some cases, at least a portion of the electrolyte is present in a separator (e.g., the pores of a separator). According to some embodiments, an electrochemical cell comprises two electrodes (e.g., a first electrode and a second electrode). For example, in FIG. 1B, electrochemical cell 101 comprises first electrode 102 and a second electrode 108.

In some embodiments, an optional layer may be positioned proximate (e.g., adjacent) an electrode. In some embodiments, the optional layer may be positioned between the first electrode and the second electrode. In some embodiments, the optional layer is positioned between the second electrode and the electrolyte. For example, in FIG. 1B, an optional layer 106 is proximate second electrode 108, positioned between first electrode 102 and second electrode 108, and positioned between second electrode 108 and electrolyte 104. In some embodiments, the optional layer comprises a protective layer as described herein. Additionally or alternatively, in some embodiments, the optional layer may be a polymer layer (e.g., a separator) that is conductive to or allows passage of ions, such as lithium ions, as described in greater detail below. In some embodiments, more than one optional layer (e.g., more than one protective layer, a protective layer and a separator) may be present. Other configurations are also possible.

As noted above, the electrochemical cells described herein may comprise an electrolyte. The electrolyte can function as a medium for the storage and transport of ions, and in the special case of solid electrolytes and gel electrolytes, these materials may additionally function as a separator between a first electrode and a second electrode (e.g., an anode and a cathode). Any liquid, solid, or gel material capable of storing and transporting ions may be used, so long as the material facilitates the transport of ions (e.g., lithium ions) between a first electrode and a second electrode (e.g., an anode and a cathode). The electrolyte is electronically non-conductive to prevent short circuiting between the first and second electrodes. In some embodiments, the electrolyte may comprise a non-solid electrolyte.

Electrolytes described herein may comprise a solvent (e.g., a first solvent). The solvent may be a polar solvent. In some embodiments, the solvent (e.g., a liquid electrolyte solvent) is a non-aqueous solvent. The solvent may comprise a variety of liquids, including sulfonamide-based, ether-based, and/or carbonate-based organic solvents, as non-limiting examples.

In some embodiments, the solvent (e.g., a first solvent) comprises an asymmetric sulfonamide. For example, in some cases the solvent is the asymmetric sulfonamide. According to some embodiments, the asymmetric sulfonamide has the formula (I):

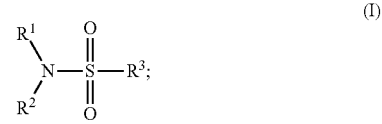

wherein, if $R^1$ is selected from unsubstituted, branched or unbranched aliphatic chains, $R^1$ comprises n carbon atoms, where n is an integer greater than or equal to 1 and less than or equal to 10; wherein, if $R^2$ is selected from unsubstituted, branched or unbranched aliphatic chains, $R^2$ comprises m carbon atoms, where m is an integer greater than or equal to 1 and less than or equal to 10; wherein, if $R^1$ and $R^2$ are connected to form an N-bound heterocycle, the N-bound heterocycle comprises j carbon atoms, where j is an integer greater than or equal to 2 and less than or equal to 11; wherein, if $R^1$ and/or $R^2$ is a silyl substituent, the silyl substituent has the form $SiR^4{}_3$, where $R^4$ is an unsubstituted, branched or unbranched aliphatic chain comprising k carbon atoms, where k is an integer greater than or equal to 1 and less than or equal to 10; and wherein $R^3$ is an electron withdrawing species.

In some embodiments, a series of compositions comprising an asymmetric sulfonamide are provided. In some embodiments, the series of compositions comprising an asymmetric sulfonamide have a formula described herein (e.g., formula (I) shown above), wherein $R^1$ and $R^2$ can be the same or different and each is selected from unsubstituted, branched or unbranched aliphatic chains; silyl substituents; or wherein $R^1$ and $R^2$ are connected to form an N-bound heterocycle. According to some embodiments of the asymmetric sulfonamides described herein, $R^1$ and $R^2$ are the same. In other embodiments of the asymmetric sulfonamides described herein, $R^1$ and $R^2$ are different. $R^1$ and $R^2$ are both unbranched aliphatic chains, according to some embodiments.

In these or other compositions or formulas where $R^1$ is present, in some embodiments, if $R^1$ is selected from unsubstituted, branched or unbranched aliphatic chains, $R^1$ comprises n carbon atoms, where n is an integer greater than or equal to 1 and less than or equal to 10 (e.g., greater than or equal to 2, greater than or equal to 4, greater than or equal to 6, greater than or equal to 8 and/or less than or equal to 8, less than or equal to 6, less than or equal to 4). For example, in some cases, n=1, 2, 3, 4, 5, 6, 7, 8, 9, or 10.

In these or other compositions or formulas where $R^1$ is present, in some embodiments, if $R^1$ is a silyl substituent, the silyl substituent has the form $SiR^4{}_3$. In these or other compositions or formulas where $R^4$ is present, each $R^4$ is independently an unsubstituted, branched or unbranched aliphatic chain comprising k carbon atoms, where k is an integer greater than or equal to 1 and less than or equal to 10 (e.g., greater than or equal to 2, greater than or equal to 4, greater than or equal to 6, greater than or equal to 8 and/or less than or equal to 8, less than or equal to 6, less than or equal to 4). For example, in some cases, k=1, 2, 3, 4, 5, 6, 7, 8, 9, or 10.

In these or other compositions or formulas where $R^2$ is present, in some embodiments, if $R^2$ is selected from unsubstituted, branched or unbranched aliphatic chains, $R^2$ comprises m carbon atoms, where m is an integer greater than or equal to 1 and less than or equal to 10 (e.g., greater than or equal to 2, greater than or equal to 4, greater than or equal to 6, greater than or equal to 8 and/or less than or equal to 8, less than or equal to 6, less than or equal to 4). For example, in some cases, m=1, 2, 3, 4, 5, 6, 7, 8, 9, or 10.

In these or other compositions or formulas where $R^2$ is present, in some embodiments, if $R^2$ is a silyl substituent, the silyl substituent has the form $SiR^4{}_3$. In these or other compositions or formulas where $R^4$ is present, each $R^4$ is independently an unsubstituted, branched or unbranched aliphatic chain comprising k carbon atoms, where k is an integer greater than or equal to 1 and less than or equal to 10 (e.g., greater than or equal to 2, greater than or equal to 4, greater than or equal to 6, greater than or equal to 8 and/or less than or equal to 8, less than or equal to 6, less than or equal to 4). For example, in some cases, k=1, 2, 3, 4, 5, 6, 7, 8, 9, or 10.

For example, in some embodiments, either $R^1$ is a silyl substituent and $R^2$ is an aliphatic chain or $R^2$ is a silyl substituent and $R^1$ is an aliphatic chain. Such examples, according to some embodiments, have the formula (II):

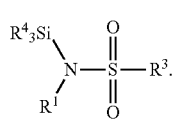
(II)

In some such embodiments, the asymmetric sulfonamide has the structure shown in formula (III):

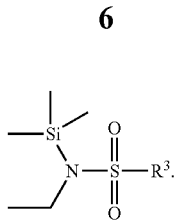
(III)

In some embodiments, $R^3$ is an electron withdrawing species as described herein. One such example is N-ethyl-N-trimethylsilyltrifluoromethylsulfonamide (Et(Me$_3$Si)NSO$_2$CF$_3$), wherein the electron withdrawing species $R^3$ is —CF$_3$. The synthesis of this compound is described in Example 1, below.

In some embodiments, asymmetric sulfonamides have the structure shown in formula (IV):

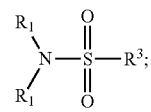
(IV)

where $R^2$ (of Formula I) is the same as $R^1$, as shown. In some such embodiments, $R^1$ is selected from unsubstituted, branched or unbranched aliphatic chains. Examples include asymmetric sulfonamides with formula (V):

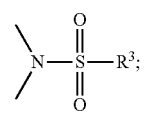
(V)

In some embodiments, $R^3$ is an electron withdrawing species as described herein. One such example is N,N-dimethylfluorosulfoneamide (Me$_2$NSO$_2$F), wherein the electron withdrawing species $R^3$ is —F. Another example is N,N-dimethyltrifluoromethylsulfoneamide (Me$_2$NSO$_2$CF$_3$), wherein the electron withdrawing species $R^3$ is —CF$_3$. Other such embodiments of asymmetric sulfonamides have the structure shown in formula (VI):

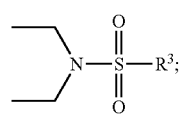
(VI)

such as N,N-diethyltrifluoromethylsulfoneamide (Et$_2$NSO$_2$CF$_3$), wherein the electron withdrawing species $R^3$ is —CF$_3$. Some embodiments, wherein $R^1$ is a branched aliphatic chain, have the structure shown in formula (VII):

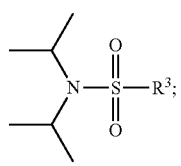
(VII)

such as N,N-diisopropyltrifluoromethylsulfoneamide (iPr$_2$NSO$_2$CF$_3$), where the electron withdrawing species R$^3$ is —CF$_3$.

In some embodiments, R$^1$ and R$^2$ are different, and each is independently selected from unsubstituted, branched or unbranched aliphatic chains. For example, some asymmetric sulfonamides have the structure shown in formula (VIII):

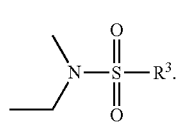

(VIII)

Such examples include N,N-ethylmethyltrifluoromethylsulfoneamide (EtMeNSO$_2$CF$_3$), where the electron withdrawing species R$^3$ is —CF$_3$.

In some embodiments, R$^1$ and R$^2$ are different, and each is independently selected from unsubstituted, branched or unbranched aliphatic chains. For example, some asymmetric sulfonamides have the structure shown in formula (IX):

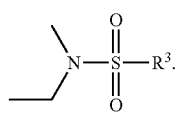

(IX)

Such examples include N,N-ethylmethyltrifluoromethylsulfoneamide (EtMeNSO$_2$CF$_3$), where the electron withdrawing species R$^3$ is —CF$_3$.

In compositions or formulas where R$^1$ and R$^2$ are connected to form an N-bound heterocycle, in some embodiments, the N-bound heterocycle comprises j carbon atoms, where j is an integer greater than or equal to 2 and less than or equal to 11 (e.g., greater than or equal to 2, greater than or equal to 4, greater than or equal to 6, greater than or equal to 8 and/or less than or equal to 8, less than or equal to 6, less than or equal to 4). For example, in some cases, j=2, 3, 4, 5, 6, 7, 8, 9, 10, or 11.

The N-bound heterocycle may be saturated or unsaturated, according to some embodiments. For example, in some embodiments, the N-bound heterocycle comprises one or more double-bonds (e.g., along the backbone of the ring). According to some embodiments, the N-bound heterocycle comprises an aromatic structure (e.g., a heteroaromatic ring). For example, in some embodiments, the N-bound heterocycle is an N-bound heterocycle. As one example, the N-bound heterocycle has the formula (X), according to some embodiments:

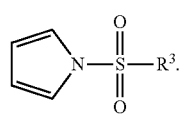

(X)

In some embodiments, R$^3$ is an electron withdrawing species as described herein. Some such embodiments include the asymmetric sulfonamide pyrrolylperfluorobutylsulfonamide, wherein the electron withdrawing species R$^3$ is —C$_4$F$_9$. The synthesis of this compound is described in Example 2, below.

In some embodiments, the N-bound heterocycle comprises more than one heteroatom. For example, the N-bound heterocycle may comprise 2, 3, 4, or more heteroatoms. According to some embodiments, a first heteroatom is the nitrogen shown in formula (I). According to some embodiments, a second heteroatom is also a nitrogen atom. For example, the N-bound heterocycle has the formula (XI), according to some embodiments:

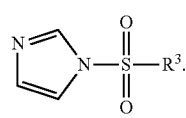

(XI)

In some embodiments, R$^3$ is an electron withdrawing species as described herein. Some such embodiments include the asymmetric sulfonamide imidazolylperfluorobutylsulfonamide, wherein the electron withdrawing species R$^3$ is —C$_4$F$_9$. The synthesis of this compound is described in Example 3, below.

In these or other compositions or formulas where R$^3$ is present, in some embodiments, R$^3$ is an electron withdrawing species. An electron withdrawing species, in the context of the sulfonamides herein, generally refers to a group that draws electrons away from the sulfur atom. For example, a fluorine atom is an electron withdrawing species with respect to the sulfur atom. When R$^3$ is an electron withdrawing species, it may contribute to the polarity of the asymmetric sulfonamide. The electron withdrawing species described herein may have different polarizations and reactivities, as described in more detail below. An electron withdrawing species may be charged or uncharged.

In one embodiment, the electron withdrawing species included in an asymmetric sulfonamide may be selected from a number of different groups. For example, the electron withdrawing species incorporated into the asymmetric sulfonamide may include, but is not limited to: a halogen atom (e.g., F, Cl), substituted or unsubstituted, branched or unbranched haloaliphatic (e.g., —CF$_3$, —C$_4$F$_9$), —CN, —COOR$_1$, —C(=O)R$_1$, —CON(R$_1$)$_2$, —CONR$_1$H, —NO$_2$, —SO$_3$R$_1$, —SO(OR$_1$)$_2$, —SO(OR$_1$)H, —SOR$_1$, —SO$_2$R$_1$, —PO(OR$_1$)$_2$, —PO(OR$_1$)H, a protonated amine group (e.g., —NR$_3^+$ and —NH$_3^+$), or a substituted aromatic group. In some embodiments, the substituted aromatic group comprises a halogen atom (e.g., F, Cl), substituted or unsubstituted, branched or unbranched haloaliphatic (e.g., —CF$_3$, —C$_4$F$_9$), —CN, —COOR$_1$, —C(=O)R$_1$, —CON(R$_1$)$_2$, —CONR$_1$H, —NO$_2$, —SO$_3$R$_1$, —SO(OR$_1$)$_2$, —SO(OR$_1$)H, —SOR$_1$, —SO$_2$R$_1$, —PO(OR)$_2$, —PO(OR$_1$)H, and/or a protonated amine group (e.g., —NR$_3^+$ and —NH$_3^+$).

Without wishing to be bound by theory, each of the above groups may exhibit electron withdrawing properties regardless of the specific functionality of R$^3$. Further, R$^3$ may exhibit electron withdrawing or donating properties, or in some instances it may be neither electron withdrawing or donating.

The solvent may comprise other non-aqueous liquid electrolyte solvents. Non-limiting examples of non-aqueous liquid electrolyte solvents include, but are not limited to, non-aqueous organic solvents, such as, for example, carbonates (described in more detail below), N-methyl acetamide, acetonitrile, acetals, ketals, esters, sulfones, sulfites, sulfolanes, aliphatic ethers, cyclic ethers, glymes, polyethers, phosphate esters, siloxanes, dioxolanes (e.g., 1,3-dioxolane), N-alkylpyrrolidones, bis(trifluoromethanesulfonyl) imide, substituted forms of the foregoing, and blends thereof. Fluorinated derivatives of the foregoing are also useful as liquid electrolyte solvents.

In some embodiments, the electrolyte comprises a second solvent (e.g., a co-solvent). In some embodiments, the presence of a second solvent in an electrolyte can improve properties of electrochemical cells, such as cycle life, overcharge stability, and/or thermal stability, and/or may reduce undesirable behaviors such as gas generation during cycling. Without wishing to be bound by theory, the presence of a second solvent (e.g., a co-solvent) may improve the solubility of species (e.g., salts) within an electrolyte. In some embodiments, the second solvent is a polar solvent. It should be appreciated, however, that in some embodiments the first solvent and/or second solvent may independently be polar or non-polar solvents.

The second solvent comprises a carbonate, according to some embodiments. In some embodiments, the carbonate is a linear carbonate. In some embodiments, the carbonate is a cyclic carbonate. According to some embodiments, the second solvent comprises more than one carbonate. For example, the second solvent comprises a first carbonate and a second carbonate, according to certain embodiments. In the context of the present disclosure, it is been inventively recognized that in some embodiments, the presence of both a cyclic carbonate and a linear carbonate in an electrolyte can unexpectedly improve the properties of an electrochemical cell, as is described in more detail below. In other embodiments, however, the second solvent is absent or does not comprise a carbonate. In some embodiments, the second solvent may include another (e.g., non-carbonate containing) non-aqueous solvent, as described herein.

In some embodiments, the first carbonate is a linear carbonate and the second carbonate is a cyclic carbonate. For example, the second solvent may comprise a mixture of dimethyl carbonate (a linear carbonate) and fluoroethylene carbonate (a cyclic carbonate). In some embodiments, the first carbonate is a cyclic carbonate and the second carbonate is a linear carbonate. The first and second carbonate may also be of the same type. For example, in some embodiments, the second solvent comprises more than one linear carbonate. In some embodiments, the second solvent comprises more than one cyclic carbonate. Additional combinations, comprising more than two carbonates are also possible.

In some embodiments, electrochemical cells comprising a first solvent comprising an asymmetric sulfonamide (e.g., an asymmetric sulfonamide having a formula of any one of Formulas I-XI), and a second solvent comprising one or more carbonates (e.g., a linear carbonate and/or a cyclic carbonate), may advantageously increase the cycle life, overcharge stability, and/or thermal stability of the electric chemical cell, as described in more detail below.

In some embodiments, the carbonate (e.g., the first carbonate) is a linear carbonate. The linear carbonate, according to some embodiments, has the chemical structure (XII)

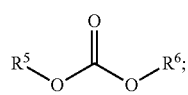

(XII)

wherein $R^5$ and $R^6$ can be the same or different, and each is independently selected from unsubstituted, branched or unbranched aliphatic; substituted or unsubstituted, branched or unbranched haloaliphatic; or substituted or unsubstituted, branched or unbranched haloheteroaliphatic chains comprising between 1 and 10 carbon atoms (e.g., greater than or equal to 2, greater than or equal to 4, greater than or equal to 6, greater than or equal to 8 and/or less than or equal to 10, less than or equal to 8, less than or equal to 6, less than or equal to 4). For example, in some cases, $R^5$ comprises 1, 2, 3, 4, 5, 6, 7, 8, 9, or 10 carbon atoms. In some cases, $R^6$ comprises 1, 2, 3, 4, 5, 6, 7, 8, 9, or 10 carbon atoms. For example, the carbonate may be dimethyl carbonate or ethylmethyl carbonate.

In some embodiments, the carbonate (e.g., the second carbonate) is a cyclic carbonate. The cyclic carbonate, according to some embodiments, has the chemical structure (XIII)

(XIII)

wherein $R^7$ connects two oxygen atoms to form a heterocycle, and is selected from unsubstituted, unbranched aliphatic; substituted or unsubstituted, unbranched haloaliphatic; or substituted or unsubstituted, unbranched haloheteroaliphatic chains comprising between 1 and 10 carbon atoms (e.g., greater than or equal to 2, greater than or equal to 4, greater than or equal to 6, greater than or equal to 8 and/or less than or equal to 10, less than or equal to 8, less than or equal to 6, less than or equal to 4). For example, in some cases, $R^7$ comprises 1, 2, 3, 4, 5, 6, 7, 8, 9, or 10 carbon atoms. For example, the cyclic carbonate may be fluoroethylene carbonate.

According to some embodiments, the solvents (e.g., the first solvent and the second solvent) form a portion of the electrolyte. In some embodiments, the solvents in total form greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, greater than or equal to 95 wt %, or more of the electrolyte. In some embodiments, the solvents in total form less than or equal to 99 wt %, less than or equal to 95 wt %, less than or equal to 90 wt %, less than or equal to 80 wt %, less than or equal to 70 wt %, less than or equal to 60 wt %, less than or equal to 50 wt %, less than or equal to 40 wt %, or less of the electrolyte. Combinations of these ranges are possible. For example, according to some embodiments, the solvents in total form greater than or equal to 10 wt % and less than or equal to 99 wt % of the electrolyte. As another example, according to some embodiments, the solvents in total form greater than or equal to 30 wt % and less than or equal to 70 wt % of the electrolyte.

In the context of the present disclosure, it has been inventively recognized that, in some embodiments, electrochemical cells wherein a first solvent comprises an asymmetric sulfonamide and a second solvent comprises both a cyclic carbonate and a linear carbonate have unexpected advantages over electrochemical cells that comprise only linear carbonates and/or cyclic carbonates. These advantages include higher cycle life, greater overcharge stability, greater thermal stability, and/or reduced gas generation, relative to cells having electrolytes that do not comprise an asymmetric sulfonamide, a linear carbonate, and a cyclic carbonate, according to some embodiments.

In some such embodiments, the molar ratio between the linear carbonate and the cyclic carbonate is greater than or equal to 0:1, greater than or equal to 1:10, greater than or equal to 1:9, greater than or equal to 1:8, greater than or equal to 1:7, greater than or equal to 1:5, greater than or equal to 1:4, greater than or equal to 1:3, greater than or equal to 1:2, greater than or equal to 1:1, greater than or equal to 2:1, greater than or equal to 3:1, greater than or equal to 4:1, greater than or equal to 5:1, greater than or equal to 6:1, or greater than or equal to 10:1. In some such embodiments, the molar ratio between the linear carbonate and the cyclic carbonate is less than or equal to 20:1, less than or equal to 10:1, less than or equal to 6:1, less than or equal to 5:1, less than or equal to 4:1, less than or equal to 3:1, less than or equal to 2:1, less than or equal to 1:1, less than or equal to 1:2, less than or equal to 1:3, less than or equal to 1:4, less than or equal to 1:5, less than or equal to 1:7, less than or equal to 1:8, less than or equal to 1:9, less than or equal to 1:10. Combinations of the above-referenced ranges are also possible. For example, the molar ratio between linear carbonates and cyclic carbonates in the second solvent may be, according to some embodiments, greater than or equal to 0:1 and less than or equal to 20:1. As another example, according to some embodiments, the molar ratio between the linear carbonate and the cyclic carbonate is between 1:6 and 1:3. Other compositions of the organic solvent are possible.

In some embodiments in which both a carbonate and an asymmetric sulfonamide are present, the molar ratio between the carbonate and the asymmetric sulfonamide is greater than or equal to 0:1, greater than or equal to 1:10, greater than or equal to 1:9, greater than or equal to 1:8, greater than or equal to 1:7, greater than or equal to 1:5, greater than or equal to 1:4, greater than or equal to 1:3, greater than or equal to 1:2, greater than or equal to 1:1, greater than or equal to 2:1, greater than or equal to 3:1, greater than or equal to 4:1, greater than or equal to 5:1, greater than or equal to 6:1, greater than or equal to 10:1. In some such embodiments, the molar ratio between the carbonate and the asymmetric sulfonamide is less than or equal to 20:1, less than or equal to 10:1, less than or equal to 6:1, less than or equal to 5:1, less than or equal to 4:1, less than or equal to 3:1, less than or equal to 2:1, less than or equal to 1:1, less than or equal to 1:2, less than or equal to 1:3, less than or equal to 1:4, less than or equal to 1:5, less than or equal to 1:7, less than or equal to 1:8, less than or equal to 1:9, less than or equal to 1:10. Combinations of the above-referenced ranges are also possible. For example, the molar ratio between the carbonate and the asymmetric sulfonamide in the electrochemical cell may be, according to some embodiments, greater than or equal to 0:1 and less than or equal to 20:1. In some embodiments, the carbonate is a linear carbonate. In some embodiments, the carbonate is a cyclic carbonate. In some embodiments, the carbonate is a combination of a linear carbonate and a cyclic carbonate, (e.g., the carbonate is a total amount of carbonate comprising the linear carbonate and the cyclic carbonate in a molar ratio described above). In some embodiments in which both a linear carbonate and a cyclic carbonate are present, each type of carbonate may independently be present in an amount with respect to an asymmetric sulfonamide in one or more of the molar ratios described above. Other compositions of the organic solvent are possible.

In some embodiments, an electrochemical cell comprising an asymmetric sulfonamide and a carbonate (e.g., a linear carbonate, a cyclic carbonate) as described herein exhibits an enhanced cycle life compared to an otherwise equivalent electrochemical cell without both the asymmetric sulfonamide and the carbonate. In some embodiments, an electrochemical cell comprising an asymmetric sulfonamide, a linear and a cyclic carbonate as described herein exhibits an enhanced cycle life compared to an otherwise equivalent electrochemical cell without both the asymmetric sulfonamide, the linear carbonate, and the cyclic carbonate.

In some embodiments, an electrochemical cell comprising an asymmetric sulfonamide and a carbonate as described herein exhibits a cycle life that is greater than or equal to 1.2, greater than or equal to 1.5, greater than or equal to 1.7, greater than or equal to 2, greater than or equal to 3, greater than or equal to 5, greater than or equal to 10, greater than or equal to 15, greater than or equal to 20, greater than or equal to 25, greater than or equal to 30, or greater than or equal to 40 times the cycle life of an otherwise equivalent electrochemical cell without the asymmetric sulfonamide and/or the carbonate. In some embodiments, the electrochemical cell comprising the asymmetric sulfonamide and the carbonate described herein exhibits a cycle life that is less than or equal to 50, less than or equal to 40, less than or equal to 30, less than or equal to 20, less than or equal to 10, or less than or equal to 3 the cycle life of an otherwise equivalent electrochemical cell without the asymmetric sulfonamide and/or the carbonate. Combinations of the above-referenced ranges are possible (e.g., greater than or equal to 1.2 times and less than or equal to 50 times). Other ranges are also possible.

In some embodiments, an electrochemical cell comprising an asymmetric sulfonamide, a linear carbonate, and a cyclic carbonate as described herein exhibits a cycle life that is greater than or equal to 1.2, greater than or equal to 1.5, greater than or equal to 1.7, greater than or equal to 2, greater than or equal to 3, greater than or equal to 5, greater than or equal to 10, greater than or equal to 15, greater than or equal to 20, greater than or equal to 25, greater than or equal to 30, or greater than or equal to 40 times the cycle life of an otherwise equivalent electrochemical cell without one or more, or all, of the asymmetric sulfonamide, the linear carbonate, and the cyclic carbonate. In some embodiments, the electrochemical cell comprising the asymmetric sulfonamide, the linear and the cyclic carbonate exhibits a cycle life that is less than or equal to 50, less than or equal to 40, less than or equal to 30, less than or equal to 20, less than or equal to 10, or less than or equal to 3 the cycle life of an otherwise equivalent electrochemical cell without one or more, or all, of the asymmetric sulfonamide, the linear carbonate, and the cyclic carbonate. Combinations of the above-referenced ranges are possible (e.g., greater than or equal to 1.2 times and less than or equal to 50 times). Other ranges are also possible In some embodiments, a solvent described herein may be incorporated into a gel polymer electrolyte. Liquid electrolyte solvents may be useful as plasticizers for gel polymer electrolytes, i.e., electrolytes comprising one or more polymers forming a semi-solid network. Examples of useful gel polymer electrolytes include, but are not limited to, those comprising one or more polymers selected from polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, poly-sulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, between 20-40%, between 60-70%, between 70-80%, between 80-90%, or between 90-95% of a liquid electrolyte by volume.

In some embodiments, one or more solid polymers can be used to form an electrolyte. Examples of useful solid polymer electrolytes include, but are not limited to, those comprising one or more polymers selected from polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In some embodiments, an electrochemical cell comprises a first electrode, comprising lithium; a first solvent comprising an asymmetric sulfonamide; and a second solvent, wherein the second solvent comprises both a cyclic carbonate and a linear carbonate, wherein the asymmetric sulfonamide has a formula (I), wherein $R^1$ and $R^2$ can be the same or different and each is independently selected from unsubstituted, branched or unbranched aliphatic chains; silyl substituents; or wherein $R^1$ and $R^2$ are connected to form an N-bound heterocycle; wherein, if $R^1$ is selected from unsubstituted, branched or unbranched aliphatic chains, $R^1$ comprises n carbon atoms, where n is an integer greater than or equal to 1 and less than or equal to 10; wherein, if $R^2$ is selected from unsubstituted, branched or unbranched aliphatic chains, $R^2$ comprises m carbon atoms, where m is an integer greater than or equal to 1 and less than or equal to 10; wherein, if $R^1$ and $R^2$ are connected to form an N-bound heterocycle, the N-bound heterocycle comprises j carbon atoms, where j is an integer greater than or equal to 2 and less than or equal to 11; wherein, if $R^1$ and/or $R^2$ is a silyl substituent, the silyl substituent has the form $SiR^4_3$, where $R^4$ is an unsubstituted, branched or unbranched aliphatic chain comprising k carbon atoms, where k is an integer greater than or equal to 1 and less than or equal to 10; and wherein $R^3$ is an electron withdrawing species.

In some embodiments, an electrochemical cell comprises a first electrode, comprising lithium; and an asymmetric sulfonamide; wherein the asymmetric sulfonamide has a formula (I); wherein $R^1$ and $R^2$ can be the same or different and each is selected from unsubstituted, branched or unbranched aliphatic chains; silyl substituents; or wherein $R^1$ and $R^2$ are connected to form an N-bound heterocycle; wherein, if $R^1$ is selected from unsubstituted, branched or unbranched aliphatic chains, $R^1$ comprises n carbon atoms, where n is an integer greater than or equal to 1 and less than or equal to 10, and $R^2$ is a silyl substituent; wherein, if $R^2$ is selected from unsubstituted, branched or unbranched aliphatic chains, $R^2$ comprises m carbon atoms, where m is an integer greater than or equal to 1 and less than or equal to 10, and $R^1$ is a silyl substituent; wherein, if $R^1$ and $R^2$ are connected to form an N-bound heterocycle, the N-bound heterocycle, comprises j carbon atoms, where j is an integer greater than or equal to 2 and less than or equal to 11; wherein, if $R^1$ and/or $R^2$ is a silyl substituent, the silyl substituent has the form $SiR^4_3$, where $R^4$ is an unsubstituted, branched or unbranched aliphatic chain comprising k carbon atoms, where k is an integer greater than or equal to 1 and less than or equal to 10; and wherein $R^3$ is an electron withdrawing species. In some embodiments, the second solvent comprises both a cyclic carbonate and a linear carbonate.

In some embodiments described above and herein, the molar ratio between the linear carbonate and the cyclic carbonate is between 1:6 and 1:3. In some embodiments described above and herein, $R^1$ and $R^2$ are both unbranched aliphatic chains. In some embodiments described above and herein, the electrochemical cell may further comprise a second electrode. In some embodiments, the second electrode may be a lithium intercalation electrode. In some embodiments, $R^1$ and $R^2$ are connected to form an N-bound heterocycle. In some embodiments, $R^1$ and/or $R^2$ is a silyl substituent. In some embodiments, an electrochemical cell comprising an asymmetric sulfonamide exhibits an enhanced cycle life. As used herein, a cycle life of an electrochemical cell is the number of charge-discharge cycles that the electrochemical cell can perform before its capacity falls below a threshold value. The threshold value may be any suitable percentage of the electrochemical cells initial charge. For example, according to some embodiments, the cycle life of an electrochemical cell is the number of charge-discharge cycles of the electrochemical cell can perform before its capacity falls below 90%, 80%, 70%, 60%, 57%, 55%, 50%, or 25% of its initial capacity.

In some embodiments, an electrochemical cell comprising an asymmetric sulfonamide described herein exhibits a cycle life of greater than or equal to 100 cycles, greater than or equal to 150 cycles, greater than or equal to 200 cycles, greater than or equal to 250 cycles, greater than or equal to 300 cycles, greater than or equal to 350 cycles, greater than or equal to 400 cycles, greater than or equal to 450 cycles, greater than or equal to 500 cycles, greater than or equal to 600 cycles, greater than or equal to 700 cycles, greater than or equal to 800 cycles, greater than or equal to 900 cycles, greater than or equal to 1000 cycles, greater than or equal to 1100 cycles, greater than or equal to 1200 cycles, greater than or equal to 1300 cycles, greater than or equal to 1500 cycles, greater than or equal to 2000 cycles, or greater. In some embodiments, an electrochemical cell comprising an asymmetric sulfonamide described herein exhibits a cycle life of less than or equal to 5000 cycles, less than or equal to 4000 cycles, less than or equal to 3000 cycles, less than or equal to 2000 cycles, less than or equal to 1500 cycles, less than or equal to 1400 cycles, less than or equal to 1300 cycles, less than or equal to 1200 cycles, less than or equal to 1100 cycles, less than or equal to 1000 cycles, less than or equal to 900 cycles, less than or equal to 800 cycles, less than or equal to 700 cycles, less than or equal to 600 cycles, less than about 500 cycles, or less. Combination of the above-referenced ranges are possible. For example, in some embodiments, an electrochemical cell comprising an asymmetric sulfonamide described herein exhibits a cycle life of greater than or equal to 100 cycles and less than or equal to 5000 cycles before its capacity falls below 60%. As another example, in some embodiments, an electrochemical cell comprising an asymmetric sulfonamide described herein exhibits a cycle life of greater than or equal to 400 cycles and less than or equal to 1500 cycles before its capacity falls below 57%. Other ranges are also possible.

In some embodiments, an electrochemical cell comprising an asymmetric sulfonamide as described herein exhibits an enhanced cycle life compared to an otherwise equivalent electrochemical cell without an asymmetric sulfonamide (all other factors being equal). In some embodiments, an electrochemical cell comprising an asymmetric sulfonamide as described herein exhibits a cycle life that is greater than or equal to 1.2, greater than or equal to 1.5, greater than or equal to 1.7, greater than or equal to 2, greater than or equal to 3, greater than or equal to 5, greater than or equal to 10, greater than or equal to 15, greater than or equal to 20, greater than or equal to 25, greater than or equal to 30, or greater than or equal to 40 times the cycle life of an otherwise equivalent electrochemical cell without the asymmetric sulfonamide. In some embodiments, the electrochemical cell comprising the asymmetric sulfonamide herein exhibits an cycle life that is less than or equal to 50, less than or equal to 40, less than or equal to 30, less than or equal to 20, less than or equal to 10, or less than or equal to 3 the cycle life of an otherwise equivalent electrochemical cell without the asymmetric sulfonamide. Combinations of the above-referenced ranges are possible (e.g., greater than or equal to 1.2 times and less than or equal to 50 times). Other ranges are also possible.

A commonly considered feature for the design of batteries (e.g., lithium batteries) is their overcharge stability. Under overcharging conditions, an electrochemical cell sustains a high voltage (an overcharge voltage) and experiences elevated temperatures. During overcharging, electrochemical cells often experience gas generation, as described in more detail below. A high degree of overcharge stability, as indicated by a higher overcharge voltage and/or a lower maximum observed temperature during overcharging, is advantageous for electrochemical cells, according to some embodiments, because these properties render the electrochemical cells safer and more stable during normal use.

According to some embodiments, electrochemical cells comprising asymmetric sulfonamides have a higher overcharge voltage than electrochemical cells without an asymmetric sulfonamide. In some embodiments, according to some embodiments, electrochemical cells comprising asymmetric sulfonamides have an overcharge voltage of greater than or equal to 12 V, greater than or equal to 13 V, greater than or equal to 14 V, greater than or equal to 15 V, greater than or equal to 15.5 V, or greater. According to some embodiments, electrochemical cells comprising asymmetric sulfonamides have an overcharge voltage of less than or equal to 20 V, less than or equal to 18 V, less than or equal to 17 V, less than or equal to 16 V, less than or equal to 15.5 V, less than or equal to 15 V, less than or equal to 14 V, less than or equal to 13 V, or less. Combinations of these ranges are possible. For example, according to some embodiments, electrochemical cells comprising asymmetric sulfonamides have an overcharge voltage of greater than or equal to 12 V and less than or equal to 20 V.

According to some embodiments, the electrochemical cell has a maximum observed temperature during overcharging of less than or equal to 150° C. less than or equal to 120° C., less than or equal to 102° C., less than or equal to 100° C., less than or equal to 98° C. less than or equal to 95° C., less than or equal to 92° C., or less. According to some embodiments, the electrochemical cell has a maximum observed temperature during overcharging of greater than or equal to 30° C., greater than or equal to 40° C., greater than or equal to 50° C., or greater. Combinations of these ranges are possible. For example, according to some embodiments electrochemical cell has a maximum observed temperature during overcharging of greater than or equal to 30° C. and less than or equal to 150° C.

A particular problem with lithium batteries is the thermal runaway which can be observed at elevated temperatures between, e.g., 150 to 230° C. and which leads to complete destruction of the battery. Various methods have been suggested to prevent such thermal runaway such as coating the electrodes with polymers. However, those methods usually lead to a dramatic reduction in capacity. The loss in capacity has been ascribed—amongst others—to formation of lithium dendrites during recharging, change of volume during charging or discharging and others.

In some embodiments, the electrochemical cells described herein can be cycled at relatively high temperatures without experiencing thermal runaway. The term "thermal runaway" is understood by those of ordinary skill in the art, and refers to a situation in which the electrochemical cell cannot dissipate the heat generated during charge and discharge sufficiently fast to prevent uncontrolled temperature increases within the cell. Often, a positive feedback loop can be created during thermal runaway (e.g., the electrochemical reaction produces heat, which increases the rate of the electrochemical reaction, which leads to further production of heat), which can cause electrochemical cells to catch fire. In some embodiments, the electrolyte (e.g., the composition of the electrolyte, which may include asymmetric sulfonamides) can be configured such that thermal runaway is not observed at relatively high temperatures of operation of the electrochemical cell. In some embodiments, this is related to the thermal stability and/or non-flammable properties of the asymmetric sulfonamides at elevated temperatures.

In some embodiments, the electrolyte can be configured such that the electrochemical cell can be operated (e.g., continuously charged and discharged) at a temperature of up to about 130° C., up to about 150° C., up to about 170° C., up to about 190° C., up to 200° C., up to 205° C., up to 210° C., up to 215° C., or up to 230° C. (e.g., as measured at the external surface of the electrochemical cell) without the electrochemical cell experiencing thermal runaway. In some embodiments, the electrochemical cell can be operated at any of the temperatures outlined above without igniting. In some embodiments, the electrochemical cells described herein can be operated at relatively high temperatures (e.g., any of the temperatures outlined above) without experiencing thermal runaway and without employing an auxiliary cooling mechanism (e.g., a heat exchanger external to the electrochemical cell, active fluid cooling external to the electrochemical cell, and the like).

In some existing systems, electrolyte degradation can result in the formation of gaseous by-products, also known as gassing, or gas generation. Gas generation in electrochemical cells typically depends, at least in part, on electrolyte composition. Without wishing to be bound by theory, gas generation electrochemical cells is often believed to occur as a result of electrolyte oxidation on the cathode side of an electrochemical cell.

As described herein, the use of an asymmetric sulfonamide in the electrolyte solution may reduce gas generation during the operation of an electrochemical cell, relative to an electrochemical cell without the asymmetric sulfonamide, all other factors being equal. In some embodiments, the amount of gas formed by an electrochemical cell comprising an asymmetric sulfonamide is reduced by greater than or equal to 5%, greater than or equal to 8%, greater than or equal to 10%, greater than or equal to 13%, greater than or equal to 14%, or more, relative to an electrochemical cell without the asymmetric sulfonamide, all other factors being equal. Electrolytes described herein may cause a plurality of gases produced by an electrochemical cell (e.g., within a lithium-based battery) to be reduced relative to the electrochemical cell absent these electrolytes. In some embodiments, the reduced gas generation is associated with the low reactivity of the asymmetric sulfonamide with electroactive materials (e.g., lithium metal).

The amount (e.g., a volume) of gaseous products produced in electrochemical cells can be determined using a fluid displacement method, wherein the volume of water displaced by the battery prior to cycling is compared with the volume of water displaced by the battery after cycling, and the volume difference is assumed to be equal to the volume of gas generated during cycling. This method was used to compute gas generation, as described in more detail in Example 4. One advantage to this method is that the volume of the electrochemical cell (e.g., before cycling, after cycling) can be determined without opening the electrochemical cell (e.g., an assembled electrochemical cell, a sealed electrochemical cell) and may be used to determine the volume of the electrochemical cell and the volume of gaseous products produced.

In some embodiments, the electrolyte comprises a fluid electrolyte (e.g., a liquid) that can be added at any suitable point in the fabrication process. In some cases, the electrochemical cell is fabricated by providing a first electrode and a second electrode (e.g., an anode and a cathode), applying an anisotropic force component normal to the active surface of the first electrode and/or second electrode, and subsequently adding the fluid electrolyte such that the electrolyte is in electrochemical communication with the first electrode and the second electrode (e.g., the anode and the cathode). In other cases, the fluid electrolyte is added to the electrochemical cell prior to or simultaneously with the application of an anisotropic force component, after which the electrolyte is in electrochemical communication with the first electrode and the second electrode (e.g., the anode and the cathode). In some embodiments, the fluid electrolyte is added to the electrochemical cell without the application of anisotropic force, and no anisotropic force is subsequently applied.

According to some embodiments, the electrolyte comprises a salt (e.g., a lithium salt). Examples of ionic electrolyte salts for use in the electrolyte of the electrochemical devices (e.g., electrochemical cells) described herein include, but are not limited to, lithium bis(fluorosulfonyl) imide (LiSCN), LiBr, LiI, lithium perchlorate ($LiClO_4$), lithium hexafluoroarsenate ($LiAsF_6$), $LiSO_3CF_3$, $LiSO_3CH_3$, lithium tetrafluoroborate ($LiBF_4$), $LiB(Ph)_4$, lithium hexafluorophosphate ($LiPF_6$), lithium trifluoromethanesulfonate ($LiCF_3SO_3$), $LiC(SO_2CF_3)_3$, lithium bis(trifluoromethanesulfonyl)imide ($LiN(SO_2CF_3)_2$), and lithium bis(fluorosulfonyl)imide (LiFSI). Other electrolyte salts that may be useful include lithium polysulfides ($Li_2S_x$), and lithium salts of organic polysulfides ($LiS_xR)_n$, where x is an integer from 1 to 20, n is an integer from 1 to 3, and R is an organic group, and those disclosed in U.S. Pat. No. 5,538,812 to Lee et al., which is incorporated herein by reference in its entirety for all purposes.

In some embodiments, the electrolyte comprises one or more room temperature ionic liquids. The room temperature ionic liquid, if present, typically comprises one or more cations and one or more anions. Non-limiting examples of suitable cations include lithium cations and/or one or more quaternary ammonium cations such as imidazolium, pyrrolidinium, pyridinium, tetraalkylammonium, pyrazolium, piperidinium, pyridazinium, pyrimidinium, pyrazinium, oxazolium, and trizolium cations. Non-limiting examples of suitable anions include trifluromethylsulfonate ($CF_3SO_3^-$), bis (fluorosulfonyl)imide ($N(FSO_2)_2^-$, bis (trifluoromethyl sulfonyl)imide (($CF_3SO_2)_2N^-$, bis (perfluoroethylsulfonyl) imide(($CF_3CF_2SO_2)_2N^-$ and tris(trifluoromethylsulfonyl) methide (($CF_3SO_2)_{3C}^-$. Non-limiting examples of suitable ionic liquids include N-methyl-N-propylpyrrolidinium/bis (fluorosulfonyl) imide and 1,2-dimethyl-3-propylimidazolium/bis(trifluoromethanesulfonyl)imide. In some embodiments, the electrolyte comprises both a room temperature ionic liquid and a lithium salt. In some other embodiments, the electrolyte comprises a room temperature ionic liquid and does not include a lithium salt.

According to some embodiments, the salt forms a portion of the electrolyte. In some embodiments, the salt forms greater than or equal to 2 wt %, greater than or equal to 5 wt %, greater than or equal to 10 wt %, greater than or equal to 15 wt %, greater than or equal to 20 wt %, greater than or equal to 30 wt %, greater than or equal to 40 wt %, or more of the electrolyte. In some embodiments, the salt forms less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 15 wt %, less than or equal to 10 wt %, less than or equal to 5 wt %, or less of the electrolyte. Combinations of these ranges are possible. For example, according to some embodiments, the salt forms greater than or equal to 80 wt % and less than or equal to 5 wt % of the electrolyte.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Liquid electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

A variety of materials can be used as a second electrode (e.g., second electrode 108 in FIG. 1B) in the electrochemical cells described herein. For example, the second electrode (e.g., anode) may comprise a lithium-containing material, wherein lithium is the electroactive material. Suitable electroactive materials (e.g., for use as anode active materials in the second electrodes described herein) include, but are not limited to, lithium metal such as lithium foil and lithium deposited onto a conductive substrate, and lithium alloys (e.g., lithium-aluminum alloys and lithium-tin alloys). Methods for depositing a negative electrode material (e.g., an alkali metal such as lithium) onto a substrate may include methods such as thermal evaporation, sputtering, jet vapor deposition, and laser ablation. Alternatively, where the second electrode comprises a lithium foil, or a lithium foil and a substrate, these can be laminated together by a lamination process as known in the art to form an electrode.

In some embodiments, the second electrode (e.g., anode) is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In some cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In some embodiments, the anode active material comprises silicon, lithium, and/or any alloys of combinations thereof. In some embodiments, the anode active material comprises lithium titanate ($Li_4Ti_5O_{12}$, also referred to as "LTO"), tin-cobalt oxide, or any combinations thereof.

In one embodiment, an electroactive lithium-containing material of a second electrode (e.g., anode) comprises greater than 50% by weight of lithium. In another embodiment, the electroactive lithium-containing material of a second electrode comprises greater than 75% by weight of lithium. In yet another embodiment, the electroactive lithium-containing material of a second electrode comprises greater than 90% by weight of lithium. Additional materials and arrangements suitable for use in the second electrode are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

In some cases, the lithium metal/lithium metal alloy may be present during only a portion of charge/discharge cycles. For example, the cell can be constructed without any lithium metal/lithium metal alloy on a current collector (e.g., a second current collector), and the lithium metal/lithium metal alloy may subsequently be deposited on the second current collector during a charging step. In some embodiments, lithium may be completely depleted after discharging such that lithium is present during only a portion of the charge/discharge cycle.

A variety of first electrodes (e.g., cathodes) can also be used in the embodiments described herein (e.g., as first electrode 102 in FIG. 1B). In some embodiments, the first electrode (e.g., cathode) comprises the treated nickel-containing intercalation compound. In some embodiments, the electroactive material of the first electrode (e.g., cathode) comprises treated nickel-containing intercalation compound as well as one or more additional cathode active materials. Examples of additional cathode active materials include, but are not limited to, one or more metal oxides, electroactive transition metal chalcogenides, electroactive conductive polymers, sulfur, carbon and/or combinations thereof.

In some embodiments, the cathode active material comprises one or more metal oxides. In some embodiments, an intercalation electrode (e.g., a lithium-intercalation electrode, a lithium-intercalation electrode) may be used. Non-limiting examples of suitable materials that may intercalate ions of an electroactive material (e.g., alkaline metal ions) include metal oxides, titanium sulfide, and iron sulfide. In some embodiments, the first electrode (e.g., cathode) is an intercalation electrode comprising a lithium transition metal oxide or a lithium transition metal phosphate. Additional examples include $Li_xCoO_2$ (e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, $LiCo_xNi_{(1-x)}O_2$, and $LiCoxNi_yMn_{(1-x-y)}O_2$ (e.g., $LiNi_{1/3}Mn_{1/3}Co_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$). X may be greater than or equal to 0 and less than or equal to 2. X is typically greater than or equal to 1 and less than or equal to 2 when the electrochemical device is fully discharged, and less than 1 when the electrochemical device is fully charged. In some embodiments, a fully charged electrochemical device may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where (0<x≤1), $LiMn_xNi_yO_4$ where (x+y=2) (e.g., $LiMn_{1.5}Ni_{0.5}O_4$), $LiNi_xCo_yAl_zO_2$ where (x+y+z=1), $LiFePO_4$, and combinations thereof. In some embodiments, the electroactive material within the first electrode (e.g., cathode) comprises lithium transition metal phosphates (e.g., $LiFePO_4$), which can, in some embodiments, be substituted with borates and/or silicates.

The first electrode (e.g., cathode) of the present invention may comprise from about 20 to 100% by weight of electroactive first electrode materials (e.g., as measured after an appropriate amount of solvent has been removed from the first electrode active layer and/or after the layer has been appropriately cured). In one embodiment, the amount of nickel-containing intercalation compound is in the range of 5-30% by weight of the first electrode. In another embodiment, the amount of nickel-containing intercalation compound in the first electrode is in the range of 20% to 90% by weight of the first electrode.

In some embodiments, an electrode (e.g., a second electrode, an anode) of the electrochemical device may comprise one or more coatings or layers formed from polymers, ceramics, and/or glasses. The coating may serve as a protective layer and may serve different functions. Those functions may include preventing the formation of dendrites during recharging which could otherwise cause short circuiting, preventing reaction of the electrode active material with electrolyte, and improving cycle life. Examples of such protective layers include those described in: U.S. Pat. No. 8,338,034 to Affinito et al. and U.S. Patent Publication No. 2015/0236322 to Laramie at al., each of which is incorporated herein by reference in its entirety for all purposes.

In some embodiments, an electrochemical cell includes a separator. The separator generally comprises a polymeric material (e.g., polymeric material that does or does not swell upon exposure to electrolyte). In some embodiments, the separator is located between the first electrode and the second electrode (e.g., the anode and the cathode).

The pores of the separator may be partially or substantially filled with liquid electrolyte. Separators may be supplied as porous free-standing films which are interleaved with the first electrode and/or the second electrode (e.g., the anode and the cathode) during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in the electrochemical devices (including electrochemical cells) described herein are those comprising a microporous xerogel layer, for example, a microporous pseudo-boehmite layer, which may be provided either as a free standing film or by a direct coating application on one of the electrodes (e.g., the second electrode), as described in U.S. Pat. Nos. 6,153,337 and 6,306,545 by Carlson et al. Solid electrolytes and gel electrolytes may also function as a separator in addition to their electrolyte function.

The separator generally comprises a polymeric material (e.g., polymeric material that does or does not swell upon exposure to electrolyte). In some embodiments, the separator is located between the electrolyte and an electrode (e.g., between the electrolyte and a first electrode, between the electrolyte and a second electrode, between the electrolyte and the first electrode, or between the electrolyte and the second electrode).

A separator can be made of a variety of materials. The separator may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ϵ-caprolactam) (Nylon 6), poly(hexamethylene adipamide) (Nylon 66)), polyimides (e.g., polynitrile, and poly (pyromellitimide-1,4-diphenyl ether) (Kapton®) (NOMEX®) (KEVLAR®)), polyether ether ketone (PEEK), and combinations thereof.

In some embodiments, an electrochemical cell comprises a protective layer over the electroactive material of the electrode (e.g., a first electrode, a second electrode). Generally, a "protective layer" is a layer of material that protects the electrode active material within the electrode from non-electrochemical chemical reactions or other unfavorable interaction with species within the electrochemical cell. For example, the protective layer can be configured to prevent chemical reaction or other unfavorable interaction between the electrode active material and a species within the electrolyte and/or between the electrode active material and a side product of the electrochemical reaction within the electrochemical cell. According to some embodiments, the protective layer is over the electroactive material of the second electrode (e.g., anode). For example, the protective layer is disposed between the second electrode (e.g., anode) and the separator, according to some embodiments.

In some embodiments, the electrochemical cells described herein comprise a first current collector (e.g., first current collector 110 in FIGS. 1A-1B). The first current collector may be electronically coupled to a first electrode and/or a plurality of first electrode portions of the electrochemical cell.

The electrochemical cells described herein may comprise one or more current collectors, as mentioned above. In some cases, the electrochemical cells comprise second current collector (e.g., optional second current collector 112 in FIGS. 1A-1B). The second current collector may be electronically coupled to a second electrode and/or a plurality of second electrode portions of the electrochemical cell.

In some embodiments, it can be advantageous to apply an anisotropic force to the electrochemical cells described herein during charge and/or discharge. The electrochemical cell may include an electrolyte comprising an asymmetric sulfonamide as described herein. In some embodiments, the electrochemical cells and/or the electrodes described herein can be configured to withstand an applied anisotropic force (e.g., a force applied to enhance the morphology of an electrode within the cell) while maintaining their structural integrity. The electrodes described herein may be a part of an electrochemical cell that is adapted and arranged such that, during at least one period of time during charge and/or discharge of the cell, an anisotropic force with a component normal to the active surface of an electrode within the electrochemical cell (e.g., an anode comprising lithium metal and/or a lithium alloy) is applied to the cell. In one set of embodiments, the applied anisotropic force can be selected to enhance the morphology of an electrode (e.g., an anode such as a lithium metal and/or a lithium alloy anode). As understood in the art, an "anisotropic force" is a force that is not equal in all directions.

In some such cases, the anisotropic force comprises a component normal to an active surface of an electrode (e.g., a first electrode such as a cathode, a second electrode such as an anode) within an electrochemical cell. As used herein, the term "active surface" is used to describe a surface of an electrode at which electrochemical reactions may take place. A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill will understand other examples of these terms, especially as applied within the description of this document. In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the anode. In some embodiments, the anisotropic force is applied uniformly over the active surface of the first electrode (e.g., a cathode) and/or the second electrode (e.g., an anode).

Any of the electrochemical cell properties and/or performance metrics described herein may be achieved, alone or in combination with each other, while an anisotropic force is applied to the electrochemical cell (e.g., during charge and/or discharge of the cell) during charge and/or discharge. In some embodiments, the anisotropic force applied to the electrode, to the electrochemical cell (e.g., during at least one period of time during charge and/or discharge of the cell) can include a component normal to an active surface of an electrode (e.g., an anode such as a lithium metal and/or lithium alloy anode within the electrochemical cell). In some embodiments, the component of the anisotropic force that is normal to the active surface of the electrode defines a pressure of greater than or equal to 1 $kg/cm^2$, greater than or equal to 2 $kg/cm^2$, greater than or equal to 4 $kg/cm^2$, greater than or equal to 6 $kg/cm^2$, greater than or equal to 8 $kg/cm^2$, greater than or equal to 10 $kg/cm^2$, greater than or equal to 12 $kg/cm^2$, greater than or equal to 14 $kg/cm^2$, greater than or equal to 16 $kg/cm^2$, greater than or equal to 18 $kg/cm^2$, greater than or equal to 20 $kg/cm^2$, greater than or equal to 22 $kg/cm^2$, greater than or equal to 24 $kg/cm^2$, greater than or equal to 26 $kg/cm^2$, greater than or equal to 28 $kg/cm^2$, greater than or equal to 30 $kg/cm^2$, greater than or equal to 32 $kg/cm^2$, greater than or equal to 34 $kg/cm^2$, greater than or equal to 36 $kg/cm^2$, greater than or equal to 38 $kg/cm^2$, greater than or equal to 40 $kg/cm^2$, greater than or equal to 42 $kg/cm^2$, greater than or equal to 44 $kg/cm^2$, greater than or equal to 46 $kg/cm^2$, or greater than or equal to 48 $kg/cm^2$. In some embodiments, the component of the anisotropic force normal to the active surface may, for example, define a pressure of less than or equal to 50 $kg/cm^2$, less than or equal to 48 $kg/cm^2$, less than or equal to 46 $kg/cm^2$, less than or equal to 44 $kg/cm^2$, less than or equal to 42 $kg/cm^2$, less than or equal to 40 $kg/cm^2$, less than or equal to 38 $kg/cm^2$, less than or equal to 36 $kg/cm^2$, less than or equal to 34 $kg/cm^2$, less than or equal to 32 $kg/cm^2$, less than or equal to 30 $kg/cm^2$, less than or equal to 28 $kg/cm^2$, less than or equal to 26 $kg/cm^2$, less than or equal to 24 $kg/cm^2$, less than or equal to 22 $kg/cm^2$, less than or equal to 20 $kg/cm^2$, less than or equal to 18 $kg/cm^2$, less about 16 $kg/cm^2$, less than or equal to 14 $kg/cm^2$, less than or equal to 12 $kg/cm^2$, less than or equal to 10 $kg/cm^2$, less than or equal to 8 $kg/cm^2$, less than or equal to 6 $kg/cm^2$, less than or equal to 4 $kg/cm^2$, or less than or equal to 2 $kg/cm^2$. Combinations of the above-referenced ranges are also possible (e.g., greater than or equal to 1 $kg/cm^2$ and less than or equal to 50 $kg/cm^2$). Other ranges are possible.

The anisotropic forces applied during charge and/or discharge as described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Pat. No. 9,105,938, which is incorporated herein by reference in its entirety.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Likewise, the term "heteroaliphatic" refers to heteroalkyl, heteroalkenyl, heteroalkynyl, and heterocyclic groups. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In some embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc.

The terms "alkenyl" and "alkynyl" refer to unsaturated aliphatic groups analogous to the alkyl groups described above, but containing at least one double or triple bond respectively. The "heteroalkenyl" and "heteroalkynyl" refer to alkenyl and alkynyl groups as described herein in which one or more atoms is a heteroatom (e.g., oxygen, nitrogen, sulfur, and the like).

The term "haloaliphatic" refers to an aliphatic group, wherein one or more hydrogen atoms, such as one to 10 hydrogen atoms, are independently replaced with a halogen atom, such as fluoro, bromo, chloro, or iodo.

The term "haloheteroaliphatic" refers to a heteroaliphatic group, wherein one or more hydrogen atoms, such as one to 10 hydrogen atoms, are independently replaced with a halogen atom, such as fluoro, bromo, chloro, or iodo.

The term "haloalkyl" is a substituted alkyl group, wherein one or more of the hydrogen atoms are independently replaced by a halogen, e.g., fluoro, bromo, chloro, or iodo. In some embodiments, the haloalkyl moiety has 1 to 8 carbon atoms ("$C_{1-8}$ haloalkyl"). In some embodiments, the haloalkyl moiety has 1 to 6 carbon atoms ("$C_{1-6}$ haloalkyl").

In some embodiments, the haloalkyl moiety has 1 to 4 carbon atoms ("$C_{1-4}$ haloalkyl"). In some embodiments, the haloalkyl moiety has 1 to 3 carbon atoms ("$C_{1-3}$ haloalkyl"). In some embodiments, the haloalkyl moiety has 1 to 2 carbon atoms ("$C_{1-2}$ haloalkyl"). Examples of haloalkyl groups include —$CHF_2$, —$CH_2F$, —$CF_3$, —$CH_2CF_3$, —$CF_2CF_3$, —$CF_2CF_2CF_3$, —$CCl_3$, —$CFCl_2$, —$CF_2Cl$, and the like.

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Heteroaryl" groups are aryl groups wherein at least one ring atom in the aromatic ring is a heteroatom, with the remainder of the ring atoms being carbon atoms. Examples of heteroaryl groups include furanyl, thienyl, pyridyl, pyrrolyl, N lower alkyl pyrrolyl, pyridyl N oxide, pyrimidyl, pyrazinyl, imidazolyl, indolyl and the like, all optionally substituted.

The terms "amine" and "amino" refer to both unsubstituted and substituted amines, e.g., a moiety that can be represented by the general formula: N(R')(R")(R''') wherein R', R", and R''' each independently represent a group permitted by the rules of valence.

The terms "acyl," "carboxyl group," or "carbonyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, the above formula represents a "ketone" group. Where W is hydrogen, the above formula represents an "aldehyde" group.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquinolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, aralkoxy, heteroaryl, heteroaryloxy, heteroarylalkyl, heteroaralkoxy, azido, amino, halogen, alkylthio, oxo, acyl, acylalkyl, carboxy esters, carboxyl, carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like.

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "directly adjacent", "immediately adjacent", "in direct contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

The following applications are incorporated herein by reference, in their entirety, for all purposes: U.S. Publication No. US-2007-0221265-A1 published on Sep. 27, 2007, filed as U.S. application Ser. No. 11/400,781 on Apr. 6, 2006, and entitled "RECHARGEABLE LITHIUM/WATER, LITHIUM/AIR BATTERIES"; U.S. Publication No. US-2009-0035646-A1, published on Feb. 5, 2009, filed as U.S. application Ser. No. 11/888,339 on Jul. 31, 2007, and entitled "SWELLING INHIBITION IN BATTERIES"; U.S. Publication No. US-2010-0129699-A1 published on May 17, 2010, filed as U.S. application Ser. No. 12/312,764 on Feb. 2, 2010; patented as U.S. Pat. No. 8,617,748 on Dec. 31, 2013, and entitled "SEPARATION OF ELECTROLYTES"; U.S. Publication No. US-2010-0291442-A1 published on Nov. 18, 2010, filed as U.S. application Ser. No. 12/682,011 on Jul. 30, 2010, patented as U.S. Pat. No. 8,871,387 on Oct. 28, 2014, and entitled "PRIMER FOR BATTERY ELECTRODE"; U.S. Publication No. US-2009-0200986-A1 published on Aug. 13, 2009, filed as U.S. application Ser. No. 12/069,335 on Feb. 8, 2008, patented as U.S. Pat. No. 8,264,205 on Sep. 11, 2012, and entitled "CIRCUIT FOR CHARGE AND/OR DISCHARGE PROTECTION IN AN ENERGY-STORAGE DEVICE"; U.S. Publication No. US-2007-0224502-A1 published on Sep. 27, 2007, filed as U.S. application Ser. No. 11/400,025 on Apr. 6, 2006, patented as U.S. Pat. No. 7,771,870 on Aug. 10, 2010, and entitled "ELECTRODE PROTECTION IN BOTH AQUEOUS AND NON-AQUEOUS ELECTROCHEMICAL CELLS, INCLUDING RECHARGEABLE LITHIUM BATTERIES"; U.S. Publication No. US-2008-0318128-A1 published on Dec. 25, 2008, filed as U.S. application Ser. No. 11/821,576 on Jun. 22, 2007, and entitled "LITHIUM ALLOY/SULFUR BATTERIES"; U.S. Publication No. US-2002-0055040-A1 published on May 9, 2002, filed as U.S. application Ser. No. 09/795,915 on Feb. 27, 2001, patented as U.S. Pat. No. 7,939,198 on May 10, 2011, and entitled "NOVEL COMPOSITE CATHODES, ELECTROCHEMICAL CELLS COMPRISING NOVEL COMPOSITE CATHODES, AND PROCESSES FOR FABRICATING SAME"; U.S. Publication No. US-2006-0238203-A1 published on Oct. 26, 2006, filed as U.S. application Ser. No. 11/111,262 on Apr. 20, 2005, patented as U.S. Pat. No. 7,688,075 on Mar. 30, 2010, and entitled "LITHIUM SULFUR RECHARGEABLE BATTERY FUEL GAUGE SYSTEMS AND METHODS"; U.S. Publication No. US-2008-0187663-A1 published on Aug. 7, 2008, filed as U.S. application Ser. No. 11/728,197 on Mar. 23, 2007, patented as U.S. Pat. No. 8,084,102 on Dec. 27, 2011, and entitled "METHODS FOR CO-FLASH EVAPORATION OF POLYMERIZABLE MONOMERS AND NON-POLYMERIZABLE CARRIER SOLVENT/SALT MIXTURES/SOLUTIONS"; U.S. Publication No. US-2011-0006738-A1 published on Jan. 13, 2011, filed as U.S. application Ser. No. 12/679,371 on Sep. 23, 2010, and entitled "ELECTROLYTE ADDITIVES FOR LITHIUM BATTERIES AND RELATED METHODS"; U.S. Publication No. US-2011-0008531-A1 published on Jan. 13, 2011, filed as U.S. application Ser. No. 12/811,576 on Sep. 23, 2010, patented as U.S. Pat. No. 9,034,421 on May 19, 2015, and entitled "METHODS OF FORMING ELECTRODES COMPRISING SULFUR AND POROUS MATERIAL COMPRISING CARBON"; U.S. Publication No. US-2010-0035128-A1 published on Feb. 11, 2010, filed as U.S. application Ser. No. 12/535,328 on Aug. 4, 2009, patented as U.S. Pat. No. 9,105,938 on Aug. 11, 2015, and entitled "APPLICATION OF FORCE IN ELECTROCHEMICAL CELLS"; U.S. Publication No. US-2011-0165471-A9 published on Jul. 15, 2011, filed as U.S. application Ser. No. 12/180,379 on Jul. 25, 2008, and entitled "PROTECTION OF ANODES FOR ELECTROCHEMICAL CELLS"; U.S. Publication No. US-2006-0222954-A1 published on Oct. 5, 2006, filed as U.S. application Ser. No. 11/452,445 on Jun. 13, 2006, patented as U.S. Pat. No. 8,415,054 on Apr. 9, 2013, and entitled "LITHIUM ANODES FOR ELECTROCHEMICAL CELLS"; U.S. Publication No. US-2010-0239914-A1 published on Sep. 23, 2010, filed as U.S. application Ser. No. 12/727,862 on Mar. 19, 2010, and entitled "CATHODE FOR LITHIUM BATTERY"; U.S. Publication No. US-2010-0294049-A1 published on Nov. 25, 2010, filed as U.S. application Ser. No. 12/471,095 on May 22, 2009, patented as U.S. Pat. No. 8,087,309 on Jan. 3, 2012, and entitled "HERMETIC SAMPLE HOLDER AND METHOD FOR PERFORMING MICROANALYSIS UNDER CONTROLLED ATMOSPHERE ENVIRONMENT"; U.S. Publication No. US-2011-0076560-A1 published on Mar. 31, 2011, filed as U.S. application Ser. No. 12/862,581 on Aug. 24, 2010, and entitled "ELECTROCHEMICAL CELLS COMPRISING POROUS STRUCTURES COMPRISING SULFUR"; U.S. Publication No. US-2011-0068001-A1 published on Mar. 24, 2011, filed as U.S. application Ser. No. 12/862,513 on Aug. 24, 2010, and entitled "RELEASE SYSTEM FOR ELECTROCHEMICAL CELLS"; U.S. Publication No. US-2012-0048729-A1 published on Mar. 1, 2012, filed as U.S. application Ser. No. 13/216,559 on Aug. 24, 2011, and entitled "ELECTRICALLY NON-CONDUCTIVE MATERIALS FOR ELECTROCHEMICAL CELLS"; U.S. Publication No. US-2011-0177398-A1 published on Jul. 21, 2011, filed as U.S. application Ser. No. 12/862,528 on Aug. 24, 2010, patented as U.S. Pat. No. 10,629,947 on Apr. 21, 2020, and entitled "ELECTROCHEMICAL CELL"; U.S. Publication No. US-2011-0070494-A1 published on Mar. 24, 2011, filed as U.S. application Ser. No. 12/862,563 on Aug. 24, 2010, and entitled "ELECTROCHEMICAL CELLS COMPRISING POROUS STRUCTURES COMPRISING SULFUR"; U.S. Publication No. US-2011-0070491-A1 published on Mar. 24, 2011, filed as U.S. application Ser. No. 12/862,551 on Aug. 24, 2010, and entitled "ELECTROCHEMICAL CELLS COMPRISING POROUS STRUCTURES COMPRISING SULFUR"; U.S. Publication No. US-2011-0059361-A1 published on Mar. 10, 2011, filed as U.S. application Ser. No. 12/862,576 on Aug. 24, 2010, patented as U.S. Pat. No. 9,005,809 on Apr. 14, 2015, and entitled "ELECTROCHEMICAL CELLS COMPRISING POROUS STRUCTURES COMPRISING SULFUR"; U.S. Publication No. US-2012-0052339-A1 published on Mar. 1, 2012, filed as U.S. application Ser. No. 13/216,579 on Aug. 24, 2011, and entitled "ELECTROLYTE MATERIALS FOR USE IN ELECTROCHEMICAL CELLS"; U.S. Publication No. US-2012-0070746-A1 published on Mar. 22, 2012, filed as U.S. application Ser. No. 13/240,113 on Sep. 22, 2011, and entitled "LOW ELECTROLYTE ELECTROCHEMICAL CELLS"; U.S. Publication No. US-2011-0206992-A1 published on Aug. 25, 2011, filed as U.S. application Ser. No. 13/033,419 on Feb. 23, 2011, and entitled "POROUS STRUCTURES FOR ENERGY STORAGE DEVICES"; U.S. Publication No. US-2012-0082872-A1 published on Apr. 5, 2012, filed as U.S. application Ser. No. 13/249,605 on Sep. 30, 2011, and entitled "ADDITIVE FOR ELECTROLYTES"; U.S. Publication No. US-2012-0082901-A1 published on Apr. 5, 2012, filed as U.S. application Ser. No. 13/249,632 on Sep. 30, 2011, and entitled "LITHIUM-BASED ANODE WITH IONIC LIQUID POLYMER GEL"; U.S. Publication No. US-2013-0164635-A1 published on Jun. 27, 2013, filed as U.S. application Ser. No. 13/700,696 on Mar. 6, 2013, patented as U.S. Pat. No. 9,577,243 on Feb. 21, 2017, and entitled "USE OF EXPANDED GRAPHITE IN LITHIUM/SULPHUR BATTERIES"; U.S. Publication No. US-2013-0017441-A1 published on Jan. 17, 2013, filed as U.S. application Ser. No. 13/524,662 on Jun. 15, 2012, patented as U.S. Pat. No. 9,548,492 on Jan. 17, 2017, and entitled "PLATING TECHNIQUE FOR ELECTRODE"; U.S. Publication No. US-2013-0224601-A1 published on Aug. 29, 2013, filed as U.S. application Ser. No. 13/766,862 on Feb. 14, 2013, patented as U.S. Pat. No. 9,077,041 on Jul. 7, 2015, and entitled "ELECTRODE STRUCTURE FOR ELECTROCHEMICAL CELL"; U.S. Publication No. US-2013-0252103-A1 published on Sep. 26, 2013, filed as U.S. application Ser. No. 13/789,783 on Mar. 8, 2013, patented as U.S. Pat. No. 9,214,678 on Dec. 15, 2015, and entitled "POROUS SUPPORT STRUCTURES, ELECTRODES CONTAINING SAME, AND ASSOCIATED METHODS"; U.S. Publication No. US-2015-0287998-A1 published on Oct. 8, 2015, filed as U.S. Application Ser. No. 14/743,304 on Jun. 18, 2015, patented as U.S. Pat. No. 9,577,267 on Feb. 21, 2017, and entitled "ELECTRODE STRUCTURE AND METHOD FOR MAKING SAME"; U.S. Publication No. US-2013-0095380-A1 published on Apr. 18, 2013, filed as U.S. application Ser. No. 13/644,933 on Oct. 4, 2012, patented as U.S. Pat. No. 8,936,870 on Jan. 20, 2015, and entitled "ELECTRODE STRUCTURE AND METHOD FOR MAKING THE SAME"; U.S. Publication No. US-2012-0052397-A1 published on Mar. 1, 2012, filed as U.S. application Ser. No. 13/216,538 on Aug. 24, 2011, patented as U.S. Pat. No. 9,853,287 on Dec. 26, 2017, and entitled "ELECTROLYTE MATERIALS FOR USE IN ELECTROCHEMICAL CELLS"; U.S. Publication No. US-2014-0123477-A1 published on May 8, 2014, filed as U.S. application Ser. No. 14/069,698 on Nov. 1, 2013, patented as U.S. Pat. No. 9,005,311 on Apr. 14, 2015, and entitled "ELECTRODE ACTIVE SURFACE PRETREATMENT"; U.S. Publication No. US-2014-0193723-A1 published on Jul. 10, 2014, filed as U.S. application Ser. No. 14/150,156 on Jan. 8, 2014, patented as U.S. Pat. No. 9,559,348 on Jan. 31, 2017, and entitled "CONDUCTIVITY CONTROL IN ELECTROCHEMICAL CELLS"; U.S. Publication No. US-2014-0255780-A1 published on Sep. 11, 2014, filed as U.S. application Ser. No. 14/197,782 on Mar. 5, 2014, patented as U.S. Pat. No. 9,490,478 on Nov. 8, 2016, and entitled "ELECTROCHEMICAL CELLS COMPRISING FIBRIL MATERIALS"; U.S. Publication No. US-2014-0272594-A1 published on Sep. 18, 2014, filed as U.S. application Ser. No. 13/833,377 on Mar. 15, 2013, and entitled "PROTECTIVE STRUCTURES FOR ELECTRODES"; U.S. Publication No. US-2014-0272597-A1 published on Sep. 18, 2014, filed as U.S. application Ser. No. 14/209,274 on Mar. 13, 2014, patented as U.S. Pat. No. 9,728,768 on Aug. 8, 2017, and entitled "PROTECTED ELECTRODE STRUCTURES AND METHODS"; U.S. Publication No. US-2015-0280277-A1 published on Oct. 1, 2015, filed as U.S. application Ser. No. 14/668,102 on Mar. 25, 2015, patented as U.S. Pat. No. 9,755,268 on Sep. 5, 2017, and entitled "GEL ELECTROLYTES AND ELECTRODES"; U.S. Publication No. US-2015-0180037-A1 published on Jun. 25, 2015, filed as U.S. application Ser. No. 14/576,570 on Dec. 19, 2014, patented as U.S. Pat. No. 10,020,512 on Jul. 10, 2018, and entitled "POLYMER FOR USE AS PROTECTIVE LAYERS AND OTHER COMPONENTS IN ELECTROCHEMICAL CELLS"; U.S. Publication No. US-2015-0349310-A1 published on Dec. 3, 2015, filed as U.S. application Ser. No. 14/723,132 on May 27, 2015, patented as U.S. Pat. No. 9,735,411 on Aug. 15, 2017, and entitled "POLYMER FOR USE AS PROTECTIVE LAYERS AND OTHER COMPONENTS IN ELECTROCHEMICAL CELLS"; U.S. Publication No. US-2014-0272595-A1 published on Sep. 18, 2014, filed as U.S. application Ser. No. 14/203,802 on Mar. 11, 2014, and entitled "COMPOSITIONS FOR USE AS PROTECTIVE LAYERS AND OTHER COMPONENTS IN ELECTROCHEMICAL CELLS"; U.S. Publication No. US-2019-0006699-A1 published on Jan. 3, 2019, filed as U.S. application Ser. No. 15/727,438 on Oct. 6, 2017, and entitled "PRESSURE AND/OR TEMPERATURE MANAGEMENT IN ELECTROCHEMICAL SYSTEMS"; U.S. Publication No. US-2014-0193713-A1 published on Jul. 10, 2014, filed as U.S. application Ser. No. 14/150,196 on Jan. 8, 2014, patented as U.S. Pat. No. 9,531,009 on Dec. 27, 2016, and entitled "PASSIVATION OF ELECTRODES IN ELECTROCHEMICAL CELLS"; U.S. Publication No. US-2014-0127577-A1 published on May 8, 2014, filed as U.S. application Ser. No. 14/068,333 on Oct. 31, 2013, patented as U.S. Pat. No. 10,243,202 on Mar. 26, 2019, and entitled "POLYMERS FOR USE AS PROTECTIVE LAYERS AND OTHER COMPONENTS IN ELECTROCHEMICAL CELLS"; U.S. Publication No. US-2015-0318539-A1 published on Nov. 5, 2015, filed as U.S. application Ser. No. 14/700,258 on Apr. 30, 2015, patented as U.S. Pat. No. 9,711,784 on Jul. 18, 2017, and entitled "ELECTRODE FABRICATION METHODS AND ASSOCIATED SYSTEMS AND ARTICLES"; U.S. Publication No. US-2014-0272565-A1 published on Sep. 18, 2014, filed as U.S. application Ser. No. 14/209,396 on Mar. 13, 2014, patented as U.S. Pat. No. 10,862,105 on Dec. 8, 2020 and entitled "PROTECTED ELECTRODE STRUCTURES"; U.S. Publication No. US-2015-0010804-A1 published on Jan. 8, 2015, filed as U.S. application Ser. No. 14/323,269 on Jul. 3, 2014, patented as U.S. Pat. No. 9,994,959 on Jun. 12, 2018, and entitled "CERAMIC/POLYMER MATRIX FOR ELECTRODE PROTECTION IN ELECTROCHEMICAL CELLS, INCLUDING RECHARGEABLE LITHIUM BATTERIES"; U.S. Publication No. US-2015-0162586-A1 published on Jun. 11, 2015, filed as U.S. application Ser. No. 14/561,305 on Dec. 5, 2014, and entitled "NEW SEPARATOR"; U.S. Publication No. US-2015-0044517-A1 published on Feb. 12, 2015, filed as U.S. application Ser. No. 14/455,230 on Aug. 8, 2014, patented as U.S. Pat. No. 10,020,479 on Jul. 10, 2018, and entitled "SELF-HEALING ELECTRODE PROTECTION IN ELECTROCHEMICAL CELLS"; U.S. Publication No. US-2015-0236322-A1 published on Aug. 20, 2015, filed as U.S. application Ser. No. 14/184,037 on Feb. 19, 2014, patented as U.S. Pat. No. 10,490,796 on Nov. 26, 2019, and entitled "ELECTRODE PROTECTION USING ELECTROLYTE-INHIBITING ION CONDUCTOR"; U.S. Publication No. US-2015-0236320-A1 published on Aug. 20, 2015, filed as U.S. application Ser. No. 14/624,641 on Feb. 18, 2015, patented as U.S. Pat. No. 9,653,750 on May 16, 2017, and entitled "ELECTRODE PROTECTION USING A COMPOSITE COMPRISING AN ELECTROLYTE-INHIBITING ION CONDUCTOR"; U.S. Publication No. US-2016-0118638-A1 published on Apr. 28, 2016, filed as U.S. application Ser. No. 14/921,381 on Oct. 23, 2015, and entitled "COMPOSITIONS FOR USE AS PROTECTIVE LAYERS AND OTHER COMPONENTS IN ELECTROCHEMICAL CELLS"; U.S. Publication No. US-2016-0118651-A1 published on Apr. 28, 2016, filed as U.S. application Ser. No. 14/918,672 on Oct. 21, 2015, and entitled "ION-CONDUCTIVE COMPOSITE FOR ELECTROCHEMICAL CELLS"; U.S. Publication No. US-2016-0072132-A1 published on Mar. 10, 2016, filed as U.S. application Ser. No. 14/848,659 on Sep. 9, 2015, and entitled "PROTECTIVE LAYERS IN LITHIUM-ION ELECTROCHEMICAL CELLS AND ASSOCIATED ELECTRODES AND METHODS"; U.S. Publication No. US-2018-0138542-A1 published on May 17, 2018, filed as U.S. application Ser. No. 15/567,534 on Oct. 18, 2017, patented as U.S. Pat. No. 10,847,833 on Nov. 24, 2020 and entitled "GLASS-CE- RAMIC ELECTROLYTES FOR LITHIUM-SULFUR BATTERIES"; U.S. Publication No. US-2016-0344067-A1 published on Nov. 24, 2016, filed as U.S. application Ser. No. 15/160,191 on May 20, 2016, patented as U.S. Pat. No. 10,461,372 on Oct. 29, 2019, and entitled "PROTECTIVE LAYERS FOR ELECTROCHEMICAL CELLS"; U.S. Publication No. US-2020-0099108-A1 published on Mar. 26, 2020, filed as U.S. application Ser. No. 16/587,939 on Sep. 30, 2019, and entitled "PROTECTIVE LAYERS FOR ELECTROCHEMICAL CELLS"; U.S. Publication No. US-2017-0141385-A1 published on May 18, 2017, filed as U.S. application Ser. No. 15/343,890 on Nov. 4, 2016, and entitled "LAYER COMPOSITE AND ELECTRODE HAVING A SMOOTH SURFACE, AND ASSOCIATED METHODS"; U.S. Publication No. US-2017-0141442-A1 published on May 18, 2017, filed as U.S. application Ser. No. 15/349,140 on Nov. 11, 2016, and entitled "ADDITIVES FOR ELECTROCHEMICAL CELLS"; patented as U.S. patent Ser. No. 10/320,031 on Jun. 11, 2019, and entitled "ADDITIVES FOR ELECTROCHEMICAL CELLS"; U.S. Publication No. US-2017-0149086-A1 published on May 25, 2017, filed as U.S. application Ser. No. 15/343,635 on Nov. 4, 2016, patented as U.S. Pat. No. 9,825,328 on Nov. 21, 2017, and entitled "IONICALLY CONDUCTIVE COMPOUNDS AND RELATED USES"; U.S. Publication No. US-2018-0337406-A1 published on Nov. 22, 2018, filed as U.S. application Ser. No. 15/983,352 on May 18, 2018, patented as U.S. Pat. No. 10,868,306 on Dec. 15, 2020 and entitled "PASSIVATING AGENTS FOR ELECTROCHEMICAL CELLS"; U.S. Publication No. US-2018-0261820-A1 published on Sep. 13, 2018, filed as U.S. application Ser. No. 15/916,588 on Mar. 9, 2018, and entitled "ELECTROCHEMICAL CELLS COMPRISING SHORT-CIRCUIT RESISTANT ELECTRONICALLY INSULATING REGIONS"; U.S. Publication No. US-2020-0243824-A1 published on Jul. 30, 2020, filed as U.S. application Ser. No. 16/098,654 on Nov. 2, 2018, and entitled "COATINGS FOR COMPONENTS OF ELECTROCHEMICAL CELLS"; U.S. Publication No. US-2018-0351158-A1 published on Dec. 6, 2018, filed as U.S. application Ser. No. 15/983,363 on May 18, 2018, patented as U.S. Pat. No. 10,944,094 on Mar. 9, 2021 and entitled "PASSIVATING AGENTS FOR ELECTROCHEMICAL CELLS"; U.S. Publication No. US-2018-0277850-A1, published on Sep. 27, 2018, filed as U.S. application Ser. No. 15/923,342 on Mar. 16, 2018, and patented as U.S. Pat. No. 10,720,648 on Jul. 21, 2020, and entitled "ELECTRODE EDGE PROTECTION IN ELECTROCHEMICAL CELLS"; U.S. Publication No. US-2018-0358651-A1, published on Dec. 13, 2018, filed as U.S. application Ser. No. 16/002,097 on Jun. 7, 2018, and patented as U.S. Pat. No. 10,608,278 on Mar. 31, 2020, and entitled "IN SITU CURRENT COLLECTOR"; U.S. Publication No. US-2017-0338475-A1, published on Nov. 23, 2017, filed as U.S. application Ser. No. 15/599,595 on May 19, 2017, patented as U.S. Pat. No. 10,879,527 on Dec. 29, 2020 and entitled "PROTECTIVE LAYERS FOR ELECTRODES AND ELECTROCHEMICAL CELLS"; U.S. Publication No. US-2019-0088958-A1, published on Mar. 21, 2019, filed as U.S. application Ser. No. 16/124,384 on Sep. 7, 2018, and entitled "PROTECTIVE MEMBRANE FOR ELECTROCHEMICAL CELLS"; U.S. Publication No. US-2019-0348672-A1, published on Nov. 14, 2019, filed as U.S. application Ser. No. 16/470,708 on Jun. 18, 2019, and entitled "PROTECTIVE LAYERS COMPRISING METALS FOR ELECTROCHEMICAL CELLS"; U.S. Publication No. US-2017-0200975-A1, published Jul. 13, 2017, filed as U.S. Application Ser. No. 15/429,439 on Feb. 10, 2017, and patented as U.S. Pat. No. 10,050,308 on Aug. 14, 2018, and entitled "LITHIUM-ION ELECTROCHEMICAL CELL, COMPONENTS THEREOF, AND METHODS OF MAKING AND USING SAME"; U.S. Publication No. US-2018-0351148-A1, published Dec. 6, 2018, filed as U.S. application Ser. No. 15/988,182 on May 24, 2018, and entitled "IONICALLY CONDUCTIVE COMPOUNDS AND RELATED USES"; U.S. Publication No. US-2018-0254516-A1, published Sep. 6, 2018, filed as U.S. application Ser. No. 15/765,362 on Apr. 2, 2018, and entitled "NON-AQUEOUS ELECTROLYTES FOR HIGH ENERGY LITHIUM-ION BATTERIES"; U.S. Publication No. US-2020-0044460-A1, published Feb. 6, 2020, filed as U.S. Application No. 16/527,903 on Jul. 31, 2019, and entitled "MULTIPLEXED CHARGE DISCHARGE BATTERY MANAGEMENT SYSTEM"; U.S. Publication No. US-2020-0220146-A1, published Jul. 9, 2020, filed as U.S. application Ser. No. 16/724,586 on Dec. 23, 2019, and entitled "ISOLATABLE ELECTRODES AND ASSOCIATED ARTICLES AND METHODS"; U.S. Publication No. US-2020-0220149-A1, published Jul. 9, 2020, filed as U.S. application Ser. No. 16/724,596 on Dec. 23, 2019, and entitled "ELECTRODES, HEATERS, SENSORS, AND ASSOCIATED ARTICLES AND METHODS"; U.S. Publication No. US-2020-0220197-A1, published Jul. 9, 2020, filed as U.S. application Ser. No. 16/724,612 on Dec. 23, 2019, and entitled "FOLDED ELECTROCHEMICAL DEVICES AND ASSOCIATED METHODS AND SYSTEMS", U.S. Publication No. US-2020-0373578-A1, published Nov. 26, 2020, filed as U.S. application Ser. No. 16/879,861 on May 21, 2020, and entitled "ELECTROCHEMICAL DEVICES INCLUDING POROUS LAYERS", U.S. Publication No. US-2020-0373551-A1, published Nov. 26, 2020, filed as U.S. application Ser. No. 16/879,839 on May 21, 2020, and entitled "ELECTRICALLY COUPLED ELECTRODES, AND ASSOCIATED ARTICLES AND METHODS", U.S. Publication No. US-2020-0395585-A1, published Dec. 17, 2020, filed as U.S. application Ser. No. 16/057,050 on Aug. 7, 2018, and entitled "LITHIUM-COATED SEPARATORS AND ELECTROCHEMICAL CELLS COMPRISING THE SAME", U.S. Publication No. US-2021-0057753-A1, published Feb. 25, 2021, filed as U.S. application Ser. No. 16/994,006 on Aug. 14, 2020, and entitled "ELECTROCHEMICAL CELLS AND COMPONENTS COMPRISING THIOL GROUP-CONTAINING SPECIES".

The following examples are intended to illustrate some embodiments of the present invention, but do not exemplify the full scope of the invention.

Example 1

This example describes the synthesis of the asymmetric sulfonamide N-ethyl-N-trimethylsilyltrifluoromethylsulfonamide ($Et(Me_3Si)NSO_2CF_3$). Under an inert atmosphere, triflic anhydride (130.4 g, 77.74 mL, 0.462 mol) was added dropwise to 2 M solution of ethylamine in tetrahydrofuran (50 g, 554.51 mL, 1.109 mol) cooled to −70° C. Reaction mixture was allowed to warm to room temperature and mixed for 12 hours. Solvent was distilled and 500 mL $H_2O$ was added to residue and resulting mixture was extracted with $CH_2Cl_2$. Extract was dried over $CaCl_2$) for a few hours. Solvent was distilled at atmospheric pressure. Vacuum distillation (b.p. 81° C./15 mmHg) gave 36.82 g (45% yield) of N-ethyltrifluoromethylsulfonamide. $^1H$ NMR in $CDCl_3$: 1.26 ppm, 3H (t $^3J$=7.2 Hz), 3.35 ppm, 2H (q $^3J$=7.2 Hz), 5.31 ppm, $^1$H (s), $^{13}$C NMR in CDCl$_3$: 15.7 ppm (CH$_3$), 39.92 ppm (CH$_2$), 119.9 ppm (CF$_3$) (q $^1$JC-F=320.8 Hz), $^{19}$F NMR in CDCl$_3$: −77.97 ppm (s).

To a solution of N-ethyltrifluoromethylsulfonamide (18.46 g, 0.104 mol) in 150 mL tetrahydrofuran in argon atmosphere at room temperature was added portionwise KH (4.179 g, 0.104 mol) while stirring and was continually stirred for 12 hours. To the formed potassium salt, Me$_3$SiCl (11.32 g, 13.22 mL, 0.104 mol) was added and reaction mixture was allowed to mix for 12 hours at room temperature. The resulting reaction mixture was filtered to remove precipitation. Solvent was distilled at atmospheric pressure. Vacuum distillation (b.p. 57° C./15 mmHg) gave 14.258 g (55% yield) of the desired product. $^1$H NMR in CDCl$_3$: 0.40 ppm, 9H (s SiMe3), 1.28 ppm, 3H (t $^3$J=7.1 Hz), 3.36 ppm, 2H (q $^3$J=7.1 Hz), $^{13}$C NMR in CDCl$_3$: 0.97 ppm (SiMe3), 17.41 ppm (CH$_3$), 43.39 ppm (CH$_2$), 120.08 ppm (CF$_3$) (q $^1$JC-F=323.18 Hz), $^{19}$F NMR in CDCl$_3$: −76.68 ppm (s), $^{29}$Si NMR in CDCl$_3$: 21.12 ppm (s).

Example 2

This example describes the synthesis of the asymmetric sulfonamide pyrrolylperfluorobutylsulfonamide, which comprises an N-bound heterocycle. The compound was synthesized by the following protocol. To a suspension of Li pyrrolate (made from pyrrole and MeLi) (3 g, 0.04 mol) in 150 mL diethyl ether, under an inert atmosphere, was added perfluorobutylsulfonyl fluoride (12.4 g, 0.04 mol) portionwise with stirring, to form a reaction mixture. The reaction mixture was allowed to stir for 12 hours at room temperature. The reaction mixture was poured into 500 mL of water, and the resulting aqueous layer was extracted with diethyl ether (2×75 mL) and methylene chloride (75 mL). The combined extract was dried over anhydrous sodium sulfate. Solvent was distilled out at atmospheric pressure. The resulting residue was distilled in vacuo (b.p. 22° C./0.7 mm Hg) to give a 54.2% yield (7.78 g). $^1$H NMR in CDCl$_3$: 6.47 ppm, 2H m, 7.14 ppm 2H m, $^{13}$C NMR in CDCl$_3$: 115.66 ppm (2 CH), 122.67 ppm (2 CH), 107-123 ppm (m, C$_4$F$_9$), $^{19}$F NMR in CDCl$_3$: −126.12 ppm (m, CF$_2$), −121.20 ppm (m, CF$_2$), −111.04 ppm (m, CF$_2$), −80.98 ppm (tt, CF$_3$, $^3$J$_{F-F}$=9.8 Hz, $^4$Jhd f-F=2.3 Hz).

Example 3

This example describes the synthesis of the asymmetric sulfonamide imidazolylperfluorobutylsulfonamide, which comprises an N-bound heterocycle. The compound was synthesized by the following protocol. To a suspension of Li imidazolate (made from imidazole and MeLi) (3 g, 0.04 mol) in 150 mL diethyl ether, under an inert atmosphere, was added perfluorobutylsulfonyl fluoride (12.4 g, 0.04 mol) portionwise with stirring, to form a reaction mixture. The reaction mixture was allowed to stir for 12 hours at room temperature. The reaction mixture was poured into 500 mL of water, and the resulting aqueous layer was extracted with diethyl ether (2×75 mL) and methylene chloride (75 mL). The combined extract was dried over anhydrous sodium sulfate. Solvent was distilled out at atmospheric pressure. The resulting residue was distilled in vacuo (b.p. 22° C./0.7 mm Hg) to give a yield of 56.1%. $^1$H NMR in CDCl$_3$: 7.28 ppm, 1H dd (3J=1.8 Hz, 4J=0.8 Hz), 7.39 ppm 1H m, 8.04 ppm 1H m, $^{13}$C NMR in CDCl$_3$: 119.35 ppm (1 CH), 132.74 ppm (1 CH), 138.41 ppm (1 CH), 105-120 ppm (m, C$_4$F$_9$), $^{19}$F NMR in CDCl$_3$: −126.29 ppm (m, CF$_2$), −121.09 ppm (m, CF$_2$), −110.41 ppm (m, CF$_2$), −81.21 ppm (tt, CF$_3$, $^3$J$_{F-F}$=9.7 Hz, $^4$J$_{F-F}$=2.1 Hz).

Example 4

This example compares the performance of exemplary electrolytes comprising asymmetric sulfonamides, linear carbonates, and cyclic carbonates in a cell comprising an NCM811 (LiNi$_{0.8}$Co$_{0.1}$Mn$_{0.1}$O$_2$) cathode, a 50 micrometer thick lithium anode, and a 9 micrometer thick polyolefin separator. Cells had a 99.4 cm$^2$ active electrode area and contained 0.5 mL of electrolyte. The composition of each electrolyte is described in Table 1. The asymmetric sulfonamides used were N,N-dimethylfluorosulfoneamide (Me$_2$NSO$_2$F), N,N-diethyltrifluoromethylsulfoneamide (Et$_2$NSO$_2$CF$_3$), N,N-dimethyltrifluoromethylsulfoneamide (Me$_2$NSO$_2$CF$_3$), and N-ethyl-N-trimethylsilyltrifluoromethylsulfonamide (Et(Me$_3$Si)NSO$_2$CF$_3$). Electrolytes 4-5 differed from Electrolytes 1-3 in that they comprised lithium bis(fluorosulfonyl)imide (LiFSI) rather than lithium hexafluorophosphate (LiPF$_6$). Moreover, Electrolyte 4 comprised ethylmethyl carbonate rather than dimethyl carbonate as the linear carbonate. For reference, a carbonate electrolyte that did not comprise an asymmetric sulfonamide was also analyzed (Electrolyte 6). During electric testing, the cells were subjected to 12 kg/cm$^2$ pressure. Charging was performed with a charge current of 75 mA at 4.4 V and discharging was performed with a discharge current of 300 mA at 3.0 V. Initially, the cells had a charge storage capacity of 121-123 mAh. Cells were cycled until they reached a charge storage cutoff capacity of 70 mAh and cycle life (the number of charges performed prior to reaching the charge storage cutoff capacity) was determined at this point. Three cells were tested per electrolyte. These results show that the cycle life of cells comprising asymmetric sulfonamides was greater than the cycle life of the cells comprising the reference electrolyte.

TABLE 1

Cycle life of batteries comprising asymmetric sulfonamides, linear carbonates, and cyclic carbonates, as well as cycle life of reference batteries lacking the asymmetric sulfonamides.

| | Composition | Cycle Life |
|---|---|---|
| Electrolyte 1 | LiPF$_6$-13 wt %, fluoroethylene carbonate-41.7 wt %, dimethyl carbonate-10 wt %, Me$_2$NSO$_2$F-35.3 wt % | 1127 cycles |
| Electrolyte 2 | LiPF$_6$-13 wt %, fluoroethylene carbonate-41.7 wt %, dimethyl carbonate-10 wt %, Et$_2$NSO$_2$CF$_3$-35.3 wt % | 1039 cycles |
| Electrolyte 3 | LiPF$_6$-13 wt %, fluoroethylene carbonate-41.7 wt %, dimethyl carbonate-10 wt %, Me$_2$NSO$_2$CF$_3$-35.3 wt % | 1174 cycles |
| Electrolyte 4 | LiFSI- 13 wt %, fluoroethylene carbonate-42 wt %, ethylmethyl carbonate-10 wt %, Et$_2$NSO$_2$CF$_3$-35 wt % | 726 cycles |
| Electrolyte 5 | LiFSI-13 wt % fluoroethylene carbonate-41.7 wt % dimethyl carbonate-10 wt % Et(Me$_3$Si)NSO$_2$CF$_3$-35.3% | 233 cycles |
| Electrolyte 6 (Reference) | LiPF$_6$-12.4 wt %, fluoroethylene carbonate-17.5 wt %, dimethyl carbonate-70.1 wt % | 453 cycles |

Example 5

This example compares the stability of exemplary electrolytes comprising asymmetric sulfonamides, linear carbonates, and cyclic carbonates in a cell comprising an NCM811 ($LiNi_{0.8}Co_{0.1}Mn_{0.1}O_2$) cathode, a 50 micrometer thick lithium anode, and a 9 micrometer thick polyolefin separator during overcharging. Cells had a 1280 $cm^2$ active electrode area and contained 7 mL of electrolyte. The composition of each electrolyte is described in Table 2. The asymmetric sulfonamides used were N,N-dimethylfluorosulfoneamide ($Me_2NSO_2F$), N,N-diethyltrifluoromethylsulfoneamide ($Et_2NSO_2CF_3$), and N,N-dimethyltrifluoromethylsulfoneamide ($Me_2NSO_2CF_3$). For reference, a carbonate electrolyte that did not comprise an asymmetric sulfonamide was also analyzed (Electrolyte 6). During electric testing, the cells were subjected to 12 $kg/cm^2$ pressure. Charging was performed with a charge current of 0.5 A at 4.35 V and discharging was performed with a discharge current of 2 A at 3.2 V. Initially, the cells had a charge storage capacity of 6 Ah. Cells were subjected to four charge-discharge cycles and were then charged to 100% state of charge (SOC) prior to overcharge testing. Overcharge test was performed at charge current of 18 A for 60 min. Cells voltage and temperature was monitored during this test. Three cells were tested per every electrolyte. Table 2 represents average test data. The results demonstrate that electrolytes comprising asymmetric sulfonamides were advantageously associated with higher maximum voltages (i.e., overcharge voltages) and lower temperatures during overcharging.

TABLE 2

Overcharge stability of batteries comprising asymmetric sulfonamides, linear carbonates, and cyclic carbonates, as well as overcharge stability of reference batteries lacking the asymmetric sulfonamides.

|  | Composition | Maximum Temp. (° C.) | Overcharge Voltage (V) |
| --- | --- | --- | --- |
| Electrolyte 7 | $LiPF_6$-13 wt %, fluoroethylene carbonate-31.7 wt %, dimethyl carbonate-10 wt %, $Me_2NSO_2CF_3$-45.3 wt % | 96 | 15.71 |
| Electrolyte 8 | $LiPF_6$-13 wt %, fluoroethylene carbonate-31.7 wt %, dimethyl carbonate-10 wt %, $Me_2NSO_2F$-45.3 wt % | 90 | 15.91 |
| Electrolyte 9 | $LiPF_6$-13 wt %, fluoroethylene carbonate-31.7 wt %, dimethyl carbonate-10 wt %, $Et_2NSO_2CF_3$-45.3 wt % | 91 | 15.69 |
| Electrolyte 6 (Reference) | $LiPF_6$-12.4 wt %, fluoroethylene carbonate-17.5 wt %, dimethyl carbonate-70.1 wt % | >400 | 11.31 |

Example 6

This example compares the thermal stability of exemplary electrolytes comprising asymmetric sulfonamides, linear carbonates, and cyclic carbonates in a cell comprising an NCM811 ($LiNi_{0.8}Co_{0.1}Mn_{0.1}O_2$) cathode, a 50 micrometer thick lithium anode, and a 9 micrometer thick polyolefin separator. The cells were identical to the cells used in Example 5. During electric testing, the cells were subjected to 12 $kg/cm^2$ pressure. Charging was performed with a charge current of 0.5 A at 4.35 V and discharging was performed with a discharge current of 2 A at 3.2 V. Initially, the cells had a charge storage capacity of 6 Ah. Cells were subjected to four charge-discharge cycles and were then charged to 100% state of charge (SOC) prior to thermal stability testing. Thermal stability tests were performed by increasing the temperature at a rate of 5° C./min from 20° C. until the cell experienced thermal runaway. The temperature at which thermal runaway occurred is reported in Table 3. These results show that the presence of the asymmetric sulfonamide was advantageously associated with an increase in thermal runaway temperature of at least 10° C.

TABLE 3

Thermal stability of batteries comprising asymmetric sulfonamides, linear carbonates, and cyclic carbonates, as well as thermal stability of reference batteries lacking the asymmetric sulfonamides.

|  | Runaway Temp. (° C.) |
| --- | --- |
| Electrolyte 7 | 215 |
| Electrolyte 8 | 215 |
| Electrolyte 9 | 210 |
| Electrolyte 6 (Reference) | 200 |

Example 7

This example compares gas generation exemplary cells. The cells were identical to the cells used in Example 5 (in this experiment, only Reference Electrolyte 6 cells and Electrolyte 8 cells were prepared). During electric testing, the cells were subjected to 12 $kg/cm^2$ pressure. Charging was performed with a charge current of 0.5 A at 4.35 V and discharging was performed with a discharge current of 2 A at 3.2 V. Initially, the cells had a charge storage capacity of 6 Ah. Initially, the cells had a charge storage capacity of 6 Ah. Cells were subjected to four charge-discharge cycles and were then charged to 100% state of charge (SOC) prior to gas generation testing. Gas generation testing was performed in three steps:

1. Cell volume $V_1$ was measured at 20° C. before exposure to high temperature;
2. Cells were stored at a temperature of 72° C. for 60 hours;
3. Cells were cooled to 20° C. and the new cell volume, $V_2$, was measured.

The increase in cell volume ($V_2$-$V_1$) was principally the result of gas generation during high temperature storage. During the test, cells with Reference Electrolyte 6 showed volume increase of 33.32 mL, while cells with Electrolyte 8 showed volume increase of 28.53 mL. This indicates that less gas was generated in the cells comprising Electrolyte 8, demonstrating that asymmetric sulfonamides may advantageously reduce gas generation within electrochemical cells.

Example 8

This example compares the performance of exemplary electrolytes comprising asymmetric sulfonamides and cyclic carbonates with only cyclic carbonates in a cell comprising an NCM811 ($LiNi_{0.8}Co_{0.1}Mn_{0.1}O_2$) cathode, a 50 micrometer thick lithium anode, and a 9 micrometer thick polyolefin separator. Cells had a 99.4 $cm^2$ active electrode area and contained 0.5 mL of electrolyte. The composition of each electrolyte is described in Table 4. The asymmetric sulfonamide was N,N-diethyltrifluoromethylsulfoneamide (Et$_2$NSO$_2$CF$_3$). During electric testing, the cells were subjected to 12 kg/cm$^2$ pressure. Charging was performed with a charge current of 75 mA at 4.4 V and discharging was performed with a discharge current of 300 mA at 3.0 V. Initially, the cells had a charge storage capacity of 123 mAh. Cells were cycled until they reached a charge storage cutoff capacity of 70 mAh and cycle life (the number of charges performed prior to reaching the charge storage cutoff capacity) was determined at this point. Three cells were tested per electrolyte. These results show that the cycle life of cells comprising asymmetric sulfonamides was greater than the cycle life of the cells comprising the reference electrolyte. These results indicate that the asymmetric sulfonamide and the fluoroethylene carbonate can, in some embodiments, produce cells with a high cycle life. For instance, when compared to Reference Electrolyte 6 of Example 4, Electrolyte 10 and Electrolyte 11 had a better cycle life. Unexpectedly, however, the cycle life of cells comprising asymmetric sulfonamides, linear carbonates, and cyclic carbonates in combination exceeded the cycle life of cells comprising electrolytes which lacked one of these components, with the lowest cycle life of such a combination, Electrolyte 2 (Cycle Life: 1039 cycles) exceeding the cycle life of the electrolytes reported here by more than a factor of two.

TABLE 4

Cycle life of batteries comprising asymmetric sulfonamides and cyclic carbonates, as well as cycle life of reference batteries lacking any carbonates.

| | Composition | Cycle Life |
|---|---|---|
| Electrolyte 10 | LiFSI- 13 wt %, fluoroethylene carbonate-43.5 wt %, Et$_2$NSO$_2$CF$_3$-35.3 wt % | 470 cycles |
| Electrolyte 11 | LiFSI-13 wt %, fluoroethylene carbonate-31.7 wt %, Et$_2$NSO$_2$CF$_3$-55.3 wt % | 512 cycles |
| Electrolyte 12 | LiFSI-13 wt %, fluoroethylene carbonate-17.4 wt %, Et$_2$NSO$_2$CF$_3$-69.6 wt % | 448 cycles |
| Electrolyte 13 (Reference) | LiFSI-13 wt %, Et$_2$NSO$_2$CF$_3$-87 wt % | 81 cycles |

Example 9

This example compares the performance of exemplary electrolytes comprising asymmetric sulfonamides and cyclic carbonates with only linear carbonates in a cell comprising an NCM811 (LiNi$_{0.8}$Co$_{0.1}$Mn$_{0.1}$O$_2$) cathode, a 50 micrometer thick lithium anode, and a 9 micrometer thick polyolefin separator. Additionally, this example compares the performance of an electrolyte comprising a symmetric sulfonamide, N,N,N',N'-tetraethylsulfamide (Et$_2$NSO$_2$NEt$_2$) with the performance of electrolytes comprising asymmetric sulfonamides. Cells had a 99.4 cm$^2$ active electrode area and contained 0.5 mL of electrolyte. The composition of each electrolyte is described in Table 4. The asymmetric sulfonamides used were N,N-diisopropyltrifluoromethylsulfoneamide (iPr$_2$NSO$_2$CF$_3$), N,N-diethyltrifluoromethylsulfoneamide (Et$_2$NSO$_2$CF$_3$), N,N-dimethyltrifluoromethylsulfoneamide (Me$_2$NSO$_2$CF$_3$), and N,N-ethylmethyltrifluoromethylsulfoneamide (EtMeNSO$_2$CF$_3$). During electric testing, the cells were subjected to 12 kg/cm$^2$ pressure. Charging was performed with a charge current of 75 mA at 4.4 V and discharging was performed with a discharge current of 300 mA at 3.0 V. Initially, the cells had a charge storage capacity of 123 mAh. Cells were cycled until they reached a charge storage cutoff capacity of 70 mAh and cycle life (the number of charges performed prior to reaching the charge storage cutoff capacity) was determined at this point. Three cells were tested per electrolyte. Unexpectedly, the cycle life of cells comprising asymmetric sulfonamides, linear carbonates, and cyclic carbonates in combination exceeded the cycle life of cells comprising electrolytes which lacked one of these components, with the lowest cycle life of such a combination, Electrolyte 2 (Cycle Life: 1039 cycles) exceeding the cycle life of the electrolytes reported here by more than a factor of four.

TABLE 5

Cycle life of batteries comprising asymmetric sulfonamides and linear carbonates, as well as a comparative example comprising a symmetric sulfonamide.

| | Composition | Cycle Life |
|---|---|---|
| Electrolyte 14 | LiPF$_6$-15 wt %, dimethyl carbonate-68 wt %, iPr$_2$NSO$_2$CF$_3$-17 wt % | 249 cycles |
| Electrolyte 15 | LiPF$_6$-15 wt %, dimethyl carbonate-68 wt %, Et$_2$NSO$_2$CF$_3$-17 wt % | 253 cycles |
| Electrolyte 16 | LiPF$_6$-15 wt %, dimethyl carbonate-68 wt %, Me$_2$NSO$_2$CF$_3$-17 wt % | 246 cycles |
| Electrolyte 17 | LiPF$_6$-15 wt %, dimethyl carbonate-68 wt %, EtMeNSO$_2$CF$_3$-17 wt % | 256 cycles |
| Electrolyte 18 (Comparative Example) | LiPF$_6$-15 wt %, dimethyl carbonate-68 wt %, Et$_2$NSO$_2$NEt$_2$-17 wt % | 34 cycles |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements.

This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "wt %" is an abbreviation of weight percentage. As used herein, "at %" is an abbreviation of atomic percentage. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
   a first electrode comprising lithium;
   a first solvent comprising an asymmetric sulfonamide; and
   a second solvent, wherein the second solvent comprises both a cyclic carbonate and a linear carbonate,
   wherein the asymmetric sulfonamide has a formula (I):

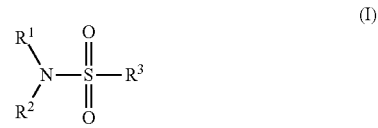

wherein $R^1$ and $R^2$ can be the same or different and each is independently selected from unsubstituted, unbranched aliphatic chains; silyl substituents; or wherein $R^1$ and $R^2$ are connected to form an N-bound heterocycle;
   wherein, if $R^1$ is selected from unsubstituted, unbranched aliphatic chains, $R^1$ comprises n carbon atoms, where n is an integer greater than or equal to 1 and less than or equal to 10;
   wherein, if $R^2$ is selected from unsubstituted, unbranched aliphatic chains, $R^2$ comprises m carbon atoms, where m is an integer greater than or equal to 1 and less than or equal to 10;
   wherein, if $R^1$ and $R^2$ are connected to form an N-bound heterocycle, the N-bound heterocycle comprises j carbon atoms, where j is an integer greater than or equal to 2 and less than or equal to 11;
   wherein, if $R^1$ and/or $R^2$ is a silyl substituent, the silyl substituent has the form $SiR^4_3$, where $R^4$ is an unsubstituted, unbranched aliphatic chain comprising k carbon atoms, where k is an integer greater than or equal to 1 and less than or equal to 10; and
   wherein $R^3$ is an electron withdrawing species.

2. The electrochemical cell of claim 1, wherein the electron withdrawing species is a halogen atom, substituted or unsubstituted, branched or unbranched haloaliphatic, —CN, —COOR$_1$, —C(=O)R$_1$, —CON(R$_1$)$_2$, —CONR$_1$H, —NO$_2$, —SO$_3$R$_1$, —SO(OR$_1$)$_2$, —SO(OR$_1$)H, —SOR$_1$, —SO$_2$R$_1$, —PO(OR$_1$)$_2$, —PO(OR$_1$) H, a protonated amine group (e.g., —NR$_3$+ and —NH$_3$+), or a substituted aromatic group.

3. The electrochemical cell of claim 2, wherein the substituted aromatic group comprises: a halogen atom, substituted or unsubstituted, branched or unbranched haloaliphatic, —CN, —COOR$_1$, —C(=O)R$_1$, —CON(R$_1$)$_2$, —CONR$_1$H, —NO$_2$, —SO$_3$R$_1$, —SO(OR$_1$)$_2$, —SO(OR$_1$) H, —SOR$_1$, —SO$_2$R$_1$, —PO(OR$_1$)$_2$, —PO(OR$_1$) H, and/or a protonated amine group (e.g., —NR$_3$+ and —NH$_3$+).

4. The electrochemical cell of claim 1, wherein $R^1$ and $R^2$ are both unbranched aliphatic chains.

5. The electrochemical cell of claim 1, wherein:
   if $R^1$ is selected from unsubstituted, unbranched aliphatic chains, n is less than or equal to 4;

if R² is selected from unsubstituted, unbranched aliphatic chains, m is less than or equal to 4;
if R¹ and R² are connected to form an N-bound heterocycle, j is less than or equal to 7;
and/or
if R¹ and/or R² is a silyl substituent, k is less than or equal to 4.

6. The electrochemical cell of claim 1, wherein R¹ is a silyl substituent.

7. The electrochemical cell of claim 1, wherein R² is a silyl substituent.

8. The electrochemical cell of claim 1, wherein R¹ and R² are connected to form an N-bound heterocycle.

9. The electrochemical cell of claim 1, wherein the linear carbonate has the chemical structure (II)

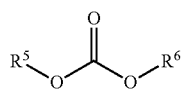
(II)

wherein R⁵ and R⁶ can be the same or different, and are both selected from unsubstituted, branched or unbranched aliphatic; substituted or unsubstituted, branched or unbranched haloaliphatic; or substituted or unsubstituted, branched or unbranched haloheteroaliphatic chains comprising between 1 and 10 carbon atoms.

10. The electrochemical cell of claim 1, wherein the cyclic carbonate has the chemical structure (III);

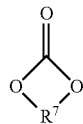
(III)

wherein R⁷ connects two oxygen atoms to form a heterocycle, and is selected from unsubstituted, unbranched aliphatic; substituted or unsubstituted, unbranched haloaliphatic; or substituted or unsubstituted, unbranched haloheteroaliphatic chains comprising between 1 and 10 carbon atoms.

11. The electrochemical cell of claim 1, wherein the molar ratio between the linear carbonate and the cyclic carbonate is between 0:1 and 10:1.

12. The electrochemical cell of claim 1, wherein the molar ratio between the linear carbonate and the cyclic carbonate is between 1:6 and 1:3.

13. The electrochemical cell of claim 1, wherein the linear carbonate is dimethyl carbonate or ethylmethyl carbonate.

14. The electrochemical cell of claim 1, wherein the cyclic carbonate is fluoroethylene carbonate.

15. The electrochemical cell of claim 1, wherein the electrochemical cell further comprises a salt.

16. The electrochemical cell of claim 1, further comprising a second electrode.

17. The electrochemical cell of claim 16, wherein the second electrode comprises lithium.

18. The electrochemical cell of claim 16, wherein the second electrode comprises lithium metal or lithium metal alloy.

19. The electrochemical cell of claim 1, wherein the first electrode is a lithium-intercalation cathode.

20. An electrochemical cell, comprising:
an electrode comprising lithium; and
an asymmetric sulfonamide;
wherein the asymmetric sulfonamide has a formula (I);

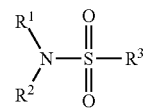
(I)

wherein R¹ and R² can be the same or different and each is selected from unsubstituted, unbranched aliphatic chains; silyl substituents; or wherein R¹ and R² are connected to form an N-bound heterocycle;
wherein, if R¹ is selected from unsubstituted, unbranched aliphatic chains, R¹ comprises n carbon atoms, where n is an integer greater than or equal to 1 and less than or equal to 10, and R² is a silyl substituent;
wherein, if R² is selected from unsubstituted, unbranched aliphatic chains, R² comprises m carbon atoms, where m is an integer greater than or equal to 1 and less than or equal to 10, and R¹ is a silyl substituent;
wherein, if R¹ and R² are connected to form an N-bound heterocycle, the N-bound heterocycle, comprises j carbon atoms, where j is an integer greater than or equal to 2 and less than or equal to 11;
wherein, if R¹ and/or R² is a silyl substituent, the silyl substituent has the form SiR⁴₃, where R⁴ is an unsubstituted, unbranched aliphatic chain comprising k carbon atoms, where k is an integer greater than or equal to 1 and less than or equal to 10; and
wherein R³ is an electron withdrawing species.

* * * * *